US010190323B2

(12) United States Patent
Meersseman et al.

(10) Patent No.: US 10,190,323 B2
(45) Date of Patent: Jan. 29, 2019

(54) FLOOR PANEL

(71) Applicant: FLOORING INDUSTRIES LIMITED, SARL, Bertrange (LU)

(72) Inventors: Laurent Meersseman, Kortrijk (BE); Luc Vanhastel, Tielt (BE)

(73) Assignee: FLOORING INDUSTRIES LIMITED, SARL, Bertrange (LU)

(*) Notice: Subject to any disclaimer, the term of this patent is extended or adjusted under 35 U.S.C. 154(b) by 0 days.

(21) Appl. No.: 16/033,494

(22) Filed: Jul. 12, 2018

(65) Prior Publication Data

US 2018/0320389 A1 Nov. 8, 2018

Related U.S. Application Data

(63) Continuation of application No. 15/724,898, filed on Oct. 4, 2017, now Pat. No. 10,041,259, which is a
(Continued)

(30) Foreign Application Priority Data

May 10, 2010 (BE) .................................... 2010/0283
May 27, 2010 (BE) .................................... 2010/0323
(Continued)

(51) Int. Cl.
*E04C 1/00* (2006.01)
*E04F 15/10* (2006.01)
(Continued)

(52) U.S. Cl.
CPC .............. *E04F 15/107* (2013.01); *B27N 7/00* (2013.01); *B32B 3/06* (2013.01); *B32B 5/18* (2013.01);
(Continued)

(58) Field of Classification Search
CPC ......... B44C 5/0476; B44C 5/043; B27N 7/00; B32B 21/08; B32B 27/304;
(Continued)

(56) References Cited

U.S. PATENT DOCUMENTS 1,387,011 A 8/1921 Ratcliff
1,448,180 A 3/1923 Atwood
(Continued)

FOREIGN PATENT DOCUMENTS

CA 1 237 344 A1 5/1988
CA 2 734 801 A1 3/2010
(Continued)

OTHER PUBLICATIONS

"High Pressure Laminates (HPL)", Composite Panel Association, http://www.decorativesurfaces.org/products/decorative-surfaces/high-pressure-laminates.html/details/, Downloaded from the Internet on Jul. 3, 2017, 3 Pages.
(Continued)

*Primary Examiner* — Brian D Mattei
(74) *Attorney, Agent, or Firm* — Workman Nydegger

(57) ABSTRACT

A floor panel has a rectangular and oblong shape, and includes a substrate and a top layer provided on the substrate and forming a decorative side of the floor panel. The top layer is composed of a print provided on a carrier sheet and a transparent thermoplastic layer situated above the print. The substrate has a thickness from 2 to 10 millimeter and forms at least half of the thickness of the floor panel. The substrate is a polyurethane-based substrate and the transparent thermoplastic layer is polyurethane-based. The floor panel has a length of more than 1.1 meters and has a plurality of reinforcing layers situated outside the center line of the substrate. A reinforcing layer may be provided in combination with the substrate and the top layer.

28 Claims, 5 Drawing Sheets

Related U.S. Application Data continuation of application No. 15/156,520, filed on May 17, 2016, now Pat. No. 9,809,984, which is a continuation of application No. 14/552,870, filed on Nov. 25, 2014, now Pat. No. 9,366,035, which is a continuation of application No. 13/808,274, filed as application No. PCT/IB2011/052715 on Jun. 21, 2011, now Pat. No. 8,925,275, which is a continuation of application No. PCT/IB2011/051886, filed on Apr. 28, 2011, and a continuation of application No. PCT/IB2011/051884, filed on Apr. 28, 2011.

(60) Provisional application No. 61/429,845, filed on Jan. 5, 2011, provisional application No. 61/426,734, filed on Dec. 23, 2010.

(30) Foreign Application Priority Data

| Jul. 9, 2010 | (BE) | 2010/0420 |
|---|---|---|
| Oct. 12, 2010 | (BE) | 2010/0602 |
| Nov. 25, 2010 | (BE) | 2010/0705 |
| Nov. 29, 2010 | (BE) | 2010/0713 |
| Dec. 2, 2010 | (BE) | 2010/0719 |
| Feb. 23, 2011 | (BE) | 2011/0128 |
| Apr. 28, 2011 | (BE) | 2011/0247 |

(51) Int. Cl.

| B32B 7/02 | (2006.01) |
|---|---|
| E04F 13/08 | (2006.01) |
| E04F 13/18 | (2006.01) |
| E04F 15/02 | (2006.01) |
| B32B 7/12 | (2006.01) |
| B32B 21/02 | (2006.01) |
| B32B 37/10 | (2006.01) |
| B32B 37/15 | (2006.01) |
| B44C 1/10 | (2006.01) |
| B44C 5/04 | (2006.01) |
| B32B 5/18 | (2006.01) |
| B32B 21/08 | (2006.01) |
| B32B 27/30 | (2006.01) |
| B32B 27/40 | (2006.01) |
| B27N 7/00 | (2006.01) |
| B32B 3/06 | (2006.01) |
| B32B 27/08 | (2006.01) |
| B32B 27/32 | (2006.01) |
| E04B 1/61 | (2006.01) |
| E04F 15/18 | (2006.01) |
| B32B 38/00 | (2006.01) |

(52) U.S. Cl.

CPC .............. *B32B 7/02* (2013.01); *B32B 7/12* (2013.01); *B32B 21/02* (2013.01); *B32B 21/08* (2013.01); *B32B 27/08* (2013.01); *B32B 27/30* (2013.01); *B32B 27/304* (2013.01); *B32B 27/32* (2013.01); *B32B 27/40* (2013.01); *B32B 37/10* (2013.01); *B32B 37/153* (2013.01); *B44C 1/10* (2013.01); *B44C 5/043* (2013.01); *B44C 5/0476* (2013.01); *E04B 1/54* (2013.01); *E04F 13/0866* (2013.01); *E04F 13/0894* (2013.01); *E04F 13/18* (2013.01); *E04F 15/02* (2013.01); *E04F 15/02022* (2013.01); *E04F 15/02033* (2013.01); *E04F 15/02038* (2013.01); *E04F 15/102* (2013.01); *E04F 15/105* (2013.01); *E04F 15/18* (2013.01); *B32B 38/145* (2013.01); *B32B 2255/10* (2013.01); *B32B 2255/26* (2013.01); *B32B 2260/021* (2013.01); *B32B 2262/067* (2013.01); *B32B 2262/101* (2013.01); *B32B 2266/0235* (2013.01); *B32B 2266/0278* (2013.01); *B32B 2307/412* (2013.01); *B32B 2307/414* (2013.01); *B32B 2307/712* (2013.01); *B32B 2307/718* (2013.01); *B32B 2307/7242* (2013.01); *B32B 2307/732* (2013.01); *B32B 2307/75* (2013.01); *B32B 2309/02* (2013.01); *B32B 2309/105* (2013.01); *B32B 2310/0825* (2013.01); *B32B 2310/0831* (2013.01); *B32B 2317/16* (2013.01); *B32B 2323/04* (2013.01); *B32B 2323/10* (2013.01); *B32B 2327/06* (2013.01); *B32B 2419/04* (2013.01); *B32B 2471/00* (2013.01); *B32B 2479/00* (2013.01); *B32B 2607/00* (2013.01); *E04F 2201/0107* (2013.01); *E04F 2201/0115* (2013.01); *E04F 2201/0123* (2013.01); *E04F 2201/0138* (2013.01); *E04F 2201/0146* (2013.01); *E04F 2201/0153* (2013.01); *E04F 2201/0176* (2013.01); *E04F 2201/023* (2013.01); *E04F 2201/049* (2013.01); *E04F 2201/0523* (2013.01); *E04F 2201/0535* (2013.01); *E04F 2201/0588* (2013.01); *E04F 2201/091* (2013.01); *E04F 2201/095* (2013.01); *E04F 2201/098* (2013.01); *Y10T 428/17* (2015.01); *Y10T 428/195* (2015.01); *Y10T 428/24488* (2015.01); *Y10T 428/24777* (2015.01)

(58) Field of Classification Search

CPC ............ E04F 15/02038; E04F 13/0894; E04F 15/02033; E04F 15/02; E04F 2201/0535; E04F 2201/0588; E04F 2201/0107; E04F 2201/0523; E04F 2201/0146; E04F 2201/0176; E04F 2201/0153; E04F 2201/0138; E04F 2201/0123; E04F 2201/049; Y10T 428/17; Y10T 428/195; Y10T 428/24488

USPC ................. 52/313, 390, 588.1, 589.1, 592.1

See application file for complete search history.

(56) References Cited

U.S. PATENT DOCUMENTS

| 1,921,164 | A | 8/1933 | Lewis |
|---|---|---|---|
| 1,971,067 | A | 8/1934 | Fess |
| 2,143,220 | A | 1/1939 | Cheney |
| 3,173,804 | A | 3/1965 | Standfuss |
| 3,434,861 | A | 3/1969 | Luc |
| 3,554,827 | A | 1/1971 | Yamagishi |
| 3,741,851 | A | 6/1973 | Erb et al. |
| 3,810,774 | A | 5/1974 | Pittman |
| 3,811,915 | A | 5/1974 | Burrell et al. |
| 3,853,685 | A | 12/1974 | Friedrich et al. |
| 3,905,849 | A | 9/1975 | Bomboire |
| 4,050,409 | A | 9/1977 | Duchenaud et al. |
| 4,097,635 | A | 6/1978 | Sanz Hernandez et al. |
| 4,208,468 | A | 6/1980 | Cunningham et al. |
| 4,233,343 | A | 11/1980 | Barker et al. |
| 4,312,686 | A | 1/1982 | Smith et al. |
| 4,379,198 | A | 4/1983 | Jaeschke et al. |
| 4,396,566 | A | 8/1983 | Brinkmann et al. |
| 4,397,896 | A | 8/1983 | Moran |
| 4,400,862 | A | 8/1983 | Ignell |
| 4,426,820 | A | 1/1984 | Terbrack et al. |
| 4,614,680 | A | 9/1986 | Fry et al. |
| 4,690,434 | A | 9/1987 | Schmidt |
| 4,778,547 | A | 10/1988 | Becker et al. |
| 4,844,763 | A | 7/1989 | Robbins |
| 4,948,653 | A | 8/1990 | Dinter et al. |
| 5,077,112 | A | 12/1991 | Hensel et al. |
| 5,082,495 | A | 1/1992 | Iijima |

(56) References Cited

U.S. PATENT DOCUMENTS

| | | |
|---|---|---|
| 5,112,671 A | 5/1992 | Diamond et al. |
| 5,261,508 A | 11/1993 | Kikuchi |
| 5,275,862 A | 1/1994 | Ramadan et al. |
| 5,437,934 A | 8/1995 | Witt et al. |
| 5,494,707 A | 2/1996 | Wang et al. |
| 5,516,472 A | 5/1996 | Laver |
| 5,560,797 A | 10/1996 | Burt et al. |
| 5,755,068 A | 5/1998 | Ormiston |
| 5,836,128 A | 11/1998 | Groh et al. |
| 5,863,632 A | 1/1999 | Bisker |
| 5,899,038 A | 5/1999 | Stroppiana |
| 5,916,662 A | 6/1999 | Schmidt |
| 5,928,772 A | 7/1999 | Shiraishi et al. |
| 5,952,076 A | 9/1999 | Foster |
| 5,988,503 A | 11/1999 | Kuo |
| 6,006,486 A | 12/1999 | Moriau et al. |
| 6,216,409 B1 | 4/2001 | Roy et al. |
| 6,247,285 B1 | 6/2001 | Moebus |
| 6,256,959 B1 | 7/2001 | Palmersten |
| 6,306,318 B1 | 10/2001 | Ricciardelli et al. |
| 6,333,094 B1 | 12/2001 | Schneider et al. |
| 6,345,481 B1 | 2/2002 | Nelson |
| 6,385,936 B1 | 5/2002 | Schneider |
| 6,428,871 B1 | 8/2002 | Cozzolino |
| 6,444,075 B1 | 9/2002 | Schneider et al. |
| 6,467,224 B1 | 10/2002 | Bertolini |
| 6,477,948 B1 | 11/2002 | Missing et al. |
| 6,536,178 B1 | 3/2003 | Palsson et al. |
| 6,591,568 B1 | 7/2003 | Palsson |
| 6,617,009 B1 | 9/2003 | Chen et al. |
| 6,647,690 B1 | 11/2003 | Martensson |
| 6,764,741 B2 | 7/2004 | Kawasumi et al. |
| 6,772,568 B2 | 8/2004 | Thiers et al. |
| 6,804,926 B1 | 10/2004 | Eisermann |
| 6,918,221 B2 | 7/2005 | Williams |
| 6,931,811 B2 | 8/2005 | Thiers |
| 6,933,043 B1 * | 8/2005 | Son .................. B32B 27/08 428/215 |
| 6,979,487 B2 | 12/2005 | Scarbrough et al. |
| 6,986,934 B2 | 1/2006 | Chen et al. |
| 6,991,830 B1 | 1/2006 | Hansson et al. |
| 7,093,399 B2 | 8/2006 | Thiers et al. |
| 7,169,460 B1 | 1/2007 | Chen et al. |
| 7,211,310 B2 | 5/2007 | Chen et al. |
| 7,243,469 B2 | 7/2007 | Miller et al. |
| 7,261,947 B2 | 8/2007 | Reichwein et al. |
| 7,357,959 B2 | 4/2008 | Bauer |
| 7,377,081 B2 | 5/2008 | Ruhdorfer |
| 7,419,717 B2 | 9/2008 | Chen et al. |
| 7,516,588 B2 | 4/2009 | Pervan |
| 7,596,920 B2 | 10/2009 | Konstanczak |
| 7,762,035 B2 | 7/2010 | Cappelle |
| 7,763,345 B2 | 7/2010 | Chen et al. |
| 8,021,741 B2 | 9/2011 | Chen et al. |
| 3,038,363 A1 | 10/2011 | Hannig et al. |
| 8,056,236 B2 | 11/2011 | Brouckaert et al. |
| 8,071,193 B2 | 12/2011 | Windmoller |
| 8,099,919 B2 | 1/2012 | Garcia |
| 8,112,891 B2 | 2/2012 | Pervan |
| 8,153,234 B2 | 4/2012 | Nollet et al. |
| 8,156,705 B2 | 4/2012 | Alford et al. |
| 8,171,691 B1 | 5/2012 | Stone |
| 8,245,477 B2 | 8/2012 | Pervan |
| 8,272,187 B2 | 9/2012 | Meersseman et al. |
| 8,375,672 B2 | 2/2013 | Hannig |
| 8,465,804 B2 | 6/2013 | Provoost et al. |
| 8,475,871 B2 | 7/2013 | Oldorff |
| 9,745,756 B2 | 8/2017 | Hannig |
| 9,783,995 B2 | 10/2017 | Meersseman et al. |
| 2001/0034991 A1 | 11/2001 | Martensson et al. |
| 2002/0020127 A1 | 2/2002 | Thiers et al. |
| 2002/0025446 A1 | 2/2002 | Chen et al. |
| 2002/0046527 A1 | 4/2002 | Nelson |
| 2002/0046528 A1 | 4/2002 | Pervan et al. |
| 2002/0056245 A1 | 5/2002 | Thiers |
| 2002/0090490 A1 | 7/2002 | Kawasumi et al. |
| 2002/0092252 A1 | 7/2002 | Kettler et al. |
| 2002/0092263 A1 | 7/2002 | Schulte |
| 2002/0136862 A1 | 9/2002 | Dong et al. |
| 2002/0142106 A1 | 10/2002 | Bethune et al. |
| 2002/0189183 A1 | 12/2002 | Ricciardelli |
| 2003/0024199 A1 | 2/2003 | Pervan et al. |
| 2003/0033777 A1 * | 2/2003 | Thiers .................. B32B 7/02 52/390 |
| 2003/0033779 A1 | 2/2003 | Downey |
| 2003/0097808 A1 | 5/2003 | Sabatini |
| 2003/0101674 A1 | 6/2003 | Pervan et al. |
| 2003/0159385 A1 | 8/2003 | Thiers |
| 2004/0016196 A1 | 1/2004 | Pervan |
| 2004/0016197 A1 | 1/2004 | Ruhdorfer |
| 2004/0026017 A1 | 2/2004 | Taylor et al. |
| 2004/0028830 A1 | 2/2004 | Bauer |
| 2004/0068954 A1 | 4/2004 | Martensson |
| 2004/0071978 A1 | 4/2004 | Hallenbeck et al. |
| 2004/0086678 A1 | 5/2004 | Chen et al. |
| 2004/0102120 A1 | 5/2004 | Plusquellec et al. |
| 2004/0103602 A1 | 6/2004 | Geraud |
| 2004/0137248 A1 | 7/2004 | Elsasser |
| 2004/0139678 A1 | 7/2004 | Pervan |
| 2004/0139679 A1 | 7/2004 | Della Pepa |
| 2004/0146695 A1 | 7/2004 | Hardwick |
| 2004/0161588 A1 | 8/2004 | Mauk et al. |
| 2004/0182036 A1 | 9/2004 | Sjoberg et al. |
| 2004/0191547 A1 | 9/2004 | Oldorff |
| 2004/0248489 A1 | 12/2004 | Hutchison et al. |
| 2004/0255538 A1 | 12/2004 | Ruhdorfer |
| 2005/0003160 A1 | 1/2005 | Chen et al. |
| 2005/0025934 A1 | 2/2005 | Thiers |
| 2005/0050827 A1 | 3/2005 | Schitter |
| 2005/0153243 A1 | 7/2005 | Rundle et al. |
| 2005/0221056 A1 | 10/2005 | Schwonke et al. |
| 2005/0281986 A1 | 12/2005 | Nam |
| 2006/0008630 A1 | 1/2006 | Thiers et al. |
| 2006/0032175 A1 | 2/2006 | Chen et al. |
| 2006/0032177 A1 | 2/2006 | Moriau et al. |
| 2006/0064940 A1 | 3/2006 | Cappelle |
| 2006/0075713 A1 | 4/2006 | Pervan et al. |
| 2006/0130416 A1 | 6/2006 | Mohr et al. |
| 2006/0179773 A1 | 8/2006 | Pervan |
| 2006/0204773 A1 | 9/2006 | Kwon et al. |
| 2006/0280870 A1 | 12/2006 | Halot et al. |
| 2007/0022694 A1 | 2/2007 | Chen et al. |
| 2007/0051064 A1 | 3/2007 | Thiers |
| 2007/0084368 A1 | 4/2007 | Vest et al. |
| 2007/0094978 A1 | 5/2007 | Svanholm et al. |
| 2007/0130872 A1 | 6/2007 | Goodwin et al. |
| 2007/0175160 A1 | 8/2007 | Groeke et al. |
| 2007/0251188 A1 | 11/2007 | Moriau et al. |
| 2007/0294968 A1 | 12/2007 | Braun |
| 2008/0005999 A1 | 1/2008 | Pervan |
| 2008/0029926 A1 | 2/2008 | Steinwender et al. |
| 2008/0034701 A1 | 2/2008 | Pervan |
| 2008/0060308 A1 | 3/2008 | Pervan |
| 2008/0138560 A1 | 6/2008 | Windmoller |
| 2008/0168737 A1 | 7/2008 | Pervan |
| 2008/0172856 A1 | 7/2008 | Brouckaert et al. |
| 2008/0261019 A1 | 10/2008 | Shen et al. |
| 2008/0305312 A1 | 12/2008 | Kim et al. |
| 2008/0311355 A1 | 12/2008 | Chen et al. |
| 2009/0019801 A1 | 1/2009 | Coghlan et al. |
| 2009/0019808 A1 | 1/2009 | Palsson et al. |
| 2009/0031662 A1 | 2/2009 | Chen et al. |
| 2009/0038254 A1 * | 2/2009 | Steele .................. E04F 15/02 52/588.1 |
| 2009/0042010 A1 | 2/2009 | Stanhope |
| 2009/0061168 A1 | 3/2009 | Kim et al. |
| 2009/0133353 A1 | 5/2009 | Pervan et al. |
| 2009/0155612 A1 | 6/2009 | Pervan et al. |
| 2009/0193741 A1 | 8/2009 | Cappelle |
| 2009/0223162 A1 | 9/2009 | Chen et al. |
| 2009/0260307 A1 | 10/2009 | Thiers |
| 2009/0260313 A1 | 10/2009 | Segaert |
| 2009/0269522 A1 | 10/2009 | Liu |
| 2009/0308001 A1 | 12/2009 | Wu et al. |

(56) References Cited

U.S. PATENT DOCUMENTS

| | | |
|---|---|---|
| 2010/0015420 A1 | 1/2010 | Riebel et al. |
| 2010/0018149 A1 | 1/2010 | Thiers |
| 2010/0055420 A1 | 3/2010 | Vermeulen |
| 2010/0083603 A1 | 4/2010 | Goodwin |
| 2010/0159213 A1 | 6/2010 | Przybylinkski et al. |
| 2010/0215875 A1 | 8/2010 | Yang et al. |
| 2010/0218450 A1 | 9/2010 | Braun et al. |
| 2010/0281803 A1 | 11/2010 | Cappelle |
| 2011/0045250 A1 | 2/2011 | De Zen |
| 2011/0056167 A1 | 3/2011 | Nilsson |
| 2011/0138722 A1 | 6/2011 | Hannig |
| 2011/0167744 A1 | 7/2011 | Whispell et al. |
| 2011/0247285 A1 | 10/2011 | Wybo et al. |
| 2011/0268937 A1 | 11/2011 | Schacht et al. |
| 2011/0287237 A1 | 11/2011 | Riebel et al. |
| 2011/0300392 A1 | 12/2011 | Vermeulen |
| 2011/0308182 A1 | 12/2011 | Downey |
| 2012/0015107 A1 | 1/2012 | Schacht et al. |
| 2012/0174521 A1 | 7/2012 | Schulte |
| 2012/0266555 A1 | 10/2012 | Cappelle |
| 2012/0276348 A1 | 11/2012 | Clausi et al. |
| 2012/0279154 A1 | 11/2012 | Bergelin et al. |
| 2013/0008118 A1 | 1/2013 | Baert et al. |
| 2013/0042558 A1 | 2/2013 | Cordeiro |
| 2013/0062006 A1 | 3/2013 | Meersseman et al. |
| 2013/0067842 A1 | 3/2013 | Meersseman et al. |
| 2013/0295352 A1 | 11/2013 | Thiers et al. |
| 2014/0020820 A1 | 1/2014 | Meersseman et al. |
| 2014/0033635 A1 | 2/2014 | Pervan et al. |
| 2014/0109507 A1 | 4/2014 | Dossche et al. |
| 2014/0290158 A1 | 10/2014 | Meersseman et al. |
| 2017/0335571 A1 | 11/2017 | Hannig |

FOREIGN PATENT DOCUMENTS

| | | |
|---|---|---|
| CN | 1119152 A | 3/1996 |
| CN | 2301491 Y | 12/1998 |
| CN | 2364121 Y | 2/2000 |
| CN | 2415082 Y | 1/2001 |
| CN | 2536701 Y | 2/2003 |
| CN | 1482166 A | 3/2004 |
| CN | 2654757 Y | 11/2004 |
| CN | 2688807 Y | 3/2005 |
| CN | 2765969 Y | 3/2006 |
| CN | 1911997 A | 2/2007 |
| CN | 2880971 Y | 3/2007 |
| CN | 101023230 A | 8/2007 |
| CN | 101042014 A | 9/2007 |
| CN | 101072691 A | 11/2007 |
| CN | 100354492 C | 12/2007 |
| CN | 101168610 A | 4/2008 |
| CN | 201071580 Y | 6/2008 |
| CN | 101367977 A | 2/2009 |
| CN | 201268019 Y | 7/2009 |
| CN | 100523404 C | 8/2009 |
| CN | 201339298 Y | 11/2009 |
| CN | 101614068 A | 12/2009 |
| CN | 101629446 A | 1/2010 |
| CN | 101767362 A | 7/2010 |
| CN | 101487336 B | 10/2010 |
| CN | 201679203 U | 12/2010 |
| CN | 101955614 A | 1/2011 |
| CN | 101613503 B | 5/2011 |
| CN | 101698749 B | 10/2011 |
| CN | 202324474 U | 7/2012 |
| CN | 202324517 U | 7/2012 |
| CN | 202483139 U | 10/2012 |
| CN | 202483140 U | 10/2012 |
| DE | 1 534 802 A1 | 4/1970 |
| DE | 2545854 A1 | 10/1976 |
| DE | 27 21 292 A1 | 11/1978 |
| DE | 28 56 391 A1 | 7/1980 |
| DE | 254 920 A1 | 3/1988 |
| DE | 195 32 819 A1 | 3/1997 |
| DE | 197 25 829 C1 | 8/1998 |
| DE | 19854475 A1 | 7/1999 |
| DE | 19944399 A1 | 4/2001 |
| DE | 203 00 306 U1 | 4/2003 |
| DE | 203 00 291 U1 | 11/2003 |
| DE | 10 2004 009 160 A1 | 9/2005 |
| DE | 10 2004 023 157 A1 | 11/2005 |
| DE | 20 2005 019 427 U1 | 4/2006 |
| DE | 10 2006 054 023 A1 | 12/2007 |
| DE | 20 2008 008 597 U1 | 8/2008 |
| DE | 20 2008 011 589 U1 | 11/2008 |
| EP | 0 007 230 A2 | 1/1980 |
| EP | 0 130 559 A2 | 1/1985 |
| EP | 0 562 402 A1 | 9/1993 |
| EP | 0 864 712 A2 | 9/1998 |
| EP | 0893473 A1 | 1/1999 |
| EP | 1 026 341 A2 | 8/2000 |
| EP | 1 138 467 A1 | 10/2001 |
| EP | 1 154 090 A1 | 11/2001 |
| EP | 1 247 641 A1 | 10/2002 |
| EP | 1 262 607 A1 | 12/2002 |
| EP | 1 262 609 A1 | 12/2002 |
| EP | 1 290 290 A1 | 3/2003 |
| EP | 1 454 763 A2 | 9/2004 |
| EP | 1 469 140 A1 | 10/2004 |
| EP | 1 493 879 A1 | 1/2005 |
| EP | 1 593 796 A1 | 11/2005 |
| EP | 1666247 A1 | 6/2006 |
| EP | 1 705 309 A2 | 9/2006 |
| EP | 1 872 959 A1 | 1/2008 |
| EP | 1 892 352 A2 | 2/2008 |
| EP | 1 938 963 A1 | 7/2008 |
| EP | 2 130 991 A2 | 12/2009 |
| EP | 2202056 A1 | 6/2010 |
| EP | 2246188 A1 | 11/2010 |
| EP | 2287418 A2 | 2/2011 |
| FR | 1293043 A | 5/1962 |
| FR | 2 149 112 A5 | 3/1973 |
| FR | 2 271 365 A1 | 12/1975 |
| FR | 2 609 664 A1 | 7/1988 |
| FR | 2 827 529 A1 | 1/2003 |
| GB | 518239 A | 2/1940 |
| GB | 900 958 A | 7/1962 |
| GB | 1 015 701 A | 1/1966 |
| GB | 1 467 899 A | 3/1977 |
| GB | 1 520 964 A | 8/1978 |
| GB | 2 020 998 A | 11/1979 |
| GB | 2 145 371 A | 3/1985 |
| GB | 2 376 916 A | 12/2002 |
| JP | S60-255843 | 12/1985 |
| JP | S60255843 A | 12/1985 |
| JP | S62-127225 A | 6/1987 |
| JP | H03-169967 A | 7/1991 |
| JP | H05-214803 A | 8/1993 |
| JP | H06-64108 A | 3/1994 |
| JP | H07-180333 A | 7/1995 |
| JP | 2000-170361 A | 6/2000 |
| KR | 1996-0005785 Y1 | 7/1996 |
| KR | 1020030050167 | 6/2003 |
| KR | 20-0399316 Y1 | 10/2005 |
| NL | 8000083 A | 8/1981 |
| WO | 95/11333 A1 | 4/1995 |
| WO | 9606248 A1 | 2/1996 |
| WO | 96/27721 A1 | 9/1996 |
| WO | 97/18949 A1 | 5/1997 |
| WO | 97/47834 A1 | 12/1997 |
| WO | 99/17930 A1 | 4/1999 |
| WO | 99/45060 A1 | 9/1999 |
| WO | 00/47841 A1 | 8/2000 |
| WO | 01/09461 A1 | 2/2001 |
| WO | 01/47724 A1 | 7/2001 |
| WO | 01/47725 A1 | 7/2001 |
| WO | 01/48333 A1 | 7/2001 |
| WO | 01/83488 A1 | 11/2001 |
| WO | 01/96689 A1 | 12/2001 |
| WO | 01/98604 A1 | 12/2001 |
| WO | 02/00449 A1 | 1/2002 |
| WO | 02/04206 A1 | 1/2002 |
| WO | 03/012224 A1 | 2/2003 |
| WO | 03/089736 A1 | 10/2003 |

(56) References Cited

FOREIGN PATENT DOCUMENTS

| | | |
|---|---|---|
| WO | 2004/015221 A1 | 2/2004 |
| WO | 2004/042168 A1 | 5/2004 |
| WO | 2005/018833 A1 | 3/2005 |
| WO | 2005/033204 A1 | 4/2005 |
| WO | 2006/033706 A1 | 3/2006 |
| WO | 2006/066776 A2 | 6/2006 |
| WO | 2006/090287 A1 | 8/2006 |
| WO | 2006/103565 A2 | 10/2006 |
| WO | 2007/059967 A1 | 5/2007 |
| WO | 2007/081267 A1 | 7/2007 |
| WO | 2007/113676 A2 | 10/2007 |
| WO | 2007/141605 A2 | 12/2007 |
| WO | 2008/078181 A1 | 7/2008 |
| WO | 2008/091045 A1 | 7/2008 |
| WO | 2008122668 A1 | 10/2008 |
| WO | 2009/061279 A1 | 5/2009 |
| WO | 2009101217 A1 | 8/2009 |
| WO | 2009/118709 A2 | 10/2009 |
| WO | 2010/023042 A1 | 3/2010 |
| WO | 2010081860 A1 | 7/2010 |
| WO | 2010/088769 A1 | 8/2010 |
| WO | 2011/028171 A1 | 3/2011 |
| WO | 2011085306 A1 | 7/2011 |
| WO | 2012/001091 A1 | 1/2012 |
| WO | 2012/001109 A1 | 1/2012 |
| WO | 2012/004700 A2 | 1/2012 |
| WO | 2012061300 A2 | 5/2012 |

OTHER PUBLICATIONS

Chang, Wen-Hsuan et al., Product Review: "Advances in Polyurethane Coatings (1969 to Early 1972)", Industrial & Engineering Chemistry Product Research & Development, vol. 12, No. 4, pp. 278-288, Sep. 7, 1973.
European Search Report Issued in EP Application No. 09015855.1, dated Jun. 7, 2010.
WPI Database week 199338 Thomson Scientific, London, GB; AN 1993-300138 XP002621436, 1 page, Feb. 16, 2011 08:59:55.
Search Report Issued in BE 2010100420, dated Feb. 15, 2011, 15 pages.
Search Report Issued in BE 2010100705, dated May 23, 2011, 10 pages.
Search Report Issued in BE 2010/00713, dated Jun. 14, 2011, 12 pages.
International Search Report and Written Opinion Issued in PCT/IB2010/055693, dated Jun. 24, 2011.
Search Report Issued in BE 2011/0719, dated Sep. 27, 2011, 9 pages.
Search Report Issued in BE 2011/0247, dated Sep. 28, 2011, 8 pages.
International Search Report and Written Opinion from International Application No. PCT/IB2011/051884, dated Nov. 22, 2011, 12 pages.
International Search Report and Written Opinion from International Application No. PCT/IB2011/051886, dated Feb. 21, 2012, 16 pages.
Search Report Issued in BE 2011/00128, dated Jun. 19, 2012, 15 pages.
International Search Report and Written Opinion from International Application No. PCT/IB2011/052715, dated Aug. 21, 2012, 16 pages.
An et al., "Building and Ornament Materials," China Architecture & Buildingpress, Feb. 2005, pp. 111-114.
Thong, "Building Plastic," China Petrochemical Press, Jan. 2007, 6 Pages.
"Acrylnitril-Butadien-Styrol-Copolymer," Wikipedia, retrieved from https://de.wikipedia.org/wiki/Acrylnitril-Butadien-Styrol-Copolymer on Mar. 14, 2018, 2 Pages.
Chanda et al., "Chapter 2 Fabrication Processes; Chapter 4 Industrial Polymers; Chapter 7 Trends in Polymer Applications," Plastics Technology Handbook Third Edition, Revised and Expanded, 1998, 20 Pages.
"Testing and Characterization of Resins," Encyclopedia of PVC, vol. 1, 1976, 4 Pages.
"Polycarbonate," Wikipedia, retrieved from https://de.wikipedia.org/wiki/Polycarbonate on Mar. 14, 2018, 4 Pages.
"Standard Specification for Solid Vinyl Floor Tile," ASTM, Designation: F 1700-96, Jul. 1996, pp. 719-721.
United States Patent Application for U.S. Appl. No. 08/899,118, filed Jul. 23, 1997, 36 Pages.

\* cited by examiner

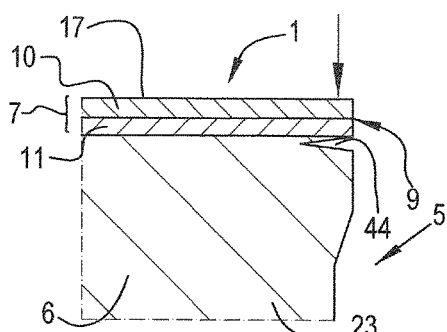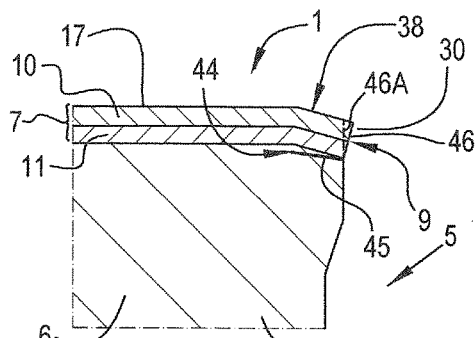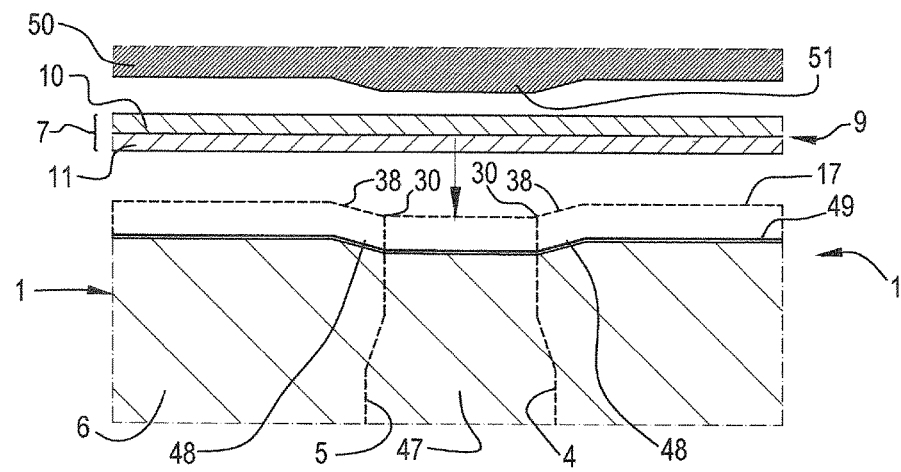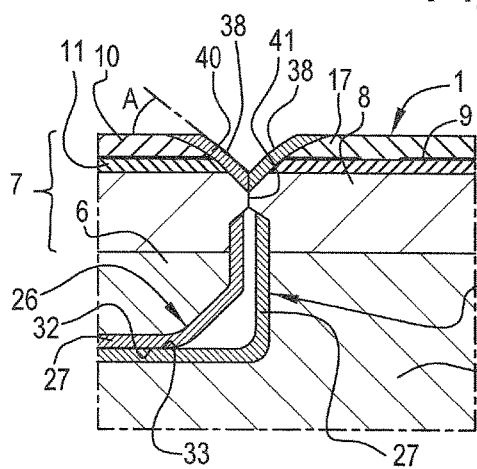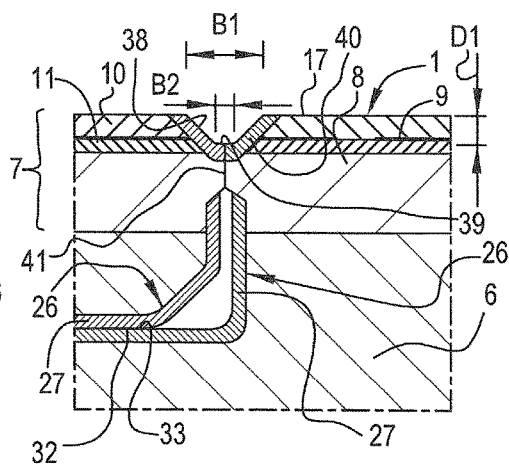

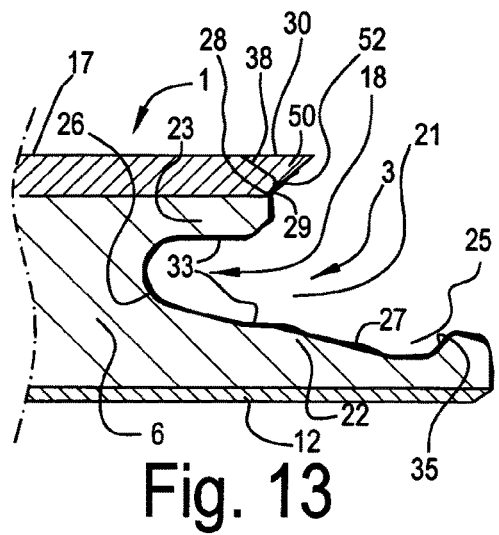
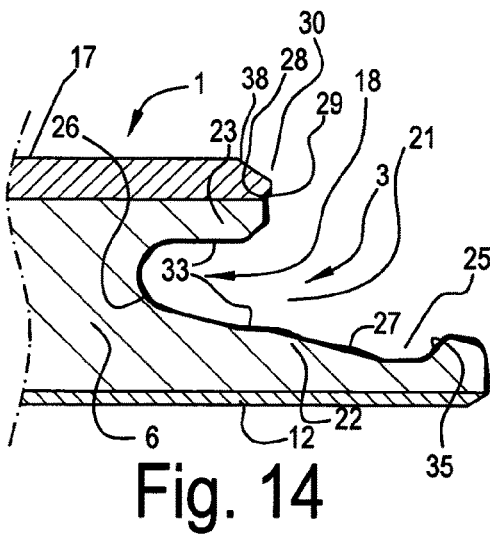
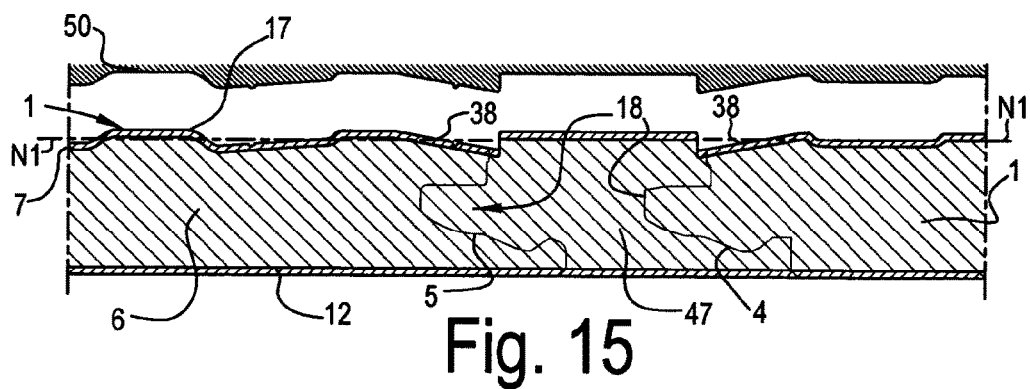

FLOOR PANEL

This application is a continuation of U.S. Ser. No. 15/724,898 filed Oct. 4, 2017, which is a continuation of U.S. Ser. No. 15/156,520, filed May 17, 2016, now U.S. Pat. No. 9,809,984, which is a continuation of U.S. Ser. No. 14/552,870, filed Nov. 25, 2014, now U.S. Pat. No. 9,366,035, which claims the benefit under 35 U.S.C. 119(e) to U.S. Ser. No. 13/808,274 filed Jan. 4, 2013, now U.S. Pat. No. 8,925,275, and the U.S. provisional applications No. 61/426,734 filed on Dec. 23, 2010 and No. 61/429,845 filed on Jan. 5, 2011.

BACKGROUND

This invention relates to floor panels.

More particularly, this invention relates to floor panels of the type which is at least composed of a substrate and a top layer provided on this substrate, wherein said top layer comprises a print. As known, above such motif a transparent or translucent synthetic material layer may be provided, which then forms part of said top layer.

In particular, the present invention relates to panels of the type which, at two or more opposite edges, comprises coupling means or coupling parts, with which two of such floor panels can be coupled at the respective edges, such that they are locked to each other in a horizontal direction perpendicular to the respective edge and as in the plane of the floor panels, as well as in a vertical direction perpendicular to the plane of the floor panels. Such floor panels can be applied for composing a so-called floating floor covering, wherein the floor panels are connected to each other at their edges, however, lie freely on the underlying surface.

RELATED ART

From WO 97/47834, laminate floor panels are known for forming a floating floor covering. However, laminate floor panels have the disadvantage that they mostly are provided with a moisture-sensitive substrate, namely, MDF or HDF (Medium Density Fiberboard or High Density Fiberboard), and that the top layer provided on this substrate, when the floor covering is in use, leads to the occurrence of ticking noises. The top layer, to wit, is composed of thermo-hardening resin and leads to the development of a very hard surface layer. The substrate, too, is hard due to the high density of MDF or HDF. On average, laminate floor panels have a thickness situated between 6 and 12 millimeters, wherein the thickness of the top layer mostly is less than 0.5 millimeters.

From EP 1 938 963 and WO 2010/023042, vinyl-based floor panels are known for forming such floating floor covering. Such vinyl-based floor panels mostly have a thickness of 3 to 5 millimeters and have a high material density. Above the print, a transparent thermoplastic layer and possibly a superficial lacquer layer are provided. The thermoplastic layer mostly has a thickness of 1 millimeter or more. Such layer, on the one hand, provides wear resistance to the floor panel, and, on the other hand, allows forming a relief on the surface. So, for example, a chamfer can be realized in this transparent layer, such as in the aforementioned WO 2010/023042, or impressions for imitating wood pores can be provided. Nevertheless, the floor panels of the state of the art still do give a plastic-like impression. The thick thermoplastic layer may lead to a reduced view on the print, by a lack of transparency. Inherent to these floor panels is also their limited bending stiffness and their high deformability. These features lead to problems when the floor panels are provided on an uneven underlying surface. Namely, after a certain period of time, the unevennesses of the underlying surface may migrate towards the surface of the floor covering. With a local load, for example, underneath the legs of tables or chairs, permanent impressions will be created, which also are undesired.

From WO 2007/081267 and US 2004/146695, floor panels are known with a substrate and a top layer provided thereon, wherein the top layer is composed of a print and a thick and soft transparent layer situated above this print. At one edge, the floor panel has a lowered edge region in the form of a groove with a horizontal bottom. Possibly, the bottom of this groove can extend on a level situated below the global level of the print. Possibly, the bottom of the groove can be performed colored. This technique is suitable for imitating cement joints or other tile joints, however, leaves much to be desired when it should be applied with floor panels representing a print with a wood pattern.

Floor panels with a relatively thick soft top layer, for example, a thermoplastic top layer, further have the disadvantage that they can be pushed upward at the edge, for example, in that the floor panels are tensioned against each other or in that, when the floor covering is being walked on, a frictional contact is created between the shoe and the edge of the top layer. This may result in an accelerated wear on these edges and/or to possibly unsafe situations. Up to now, it was thought that a thick transparent top layer was necessary for withstanding such wear.

SUMMARY

The present invention relates to an alternative panel, which in first instance is intended as a floor panel for forming a floating floor covering. According to various preferred embodiments of the invention, also a solution is offered for one or more problems with the floor panels of the state of the art.

To this aim, the invention, according to its first independent aspect, relates to a floor panel, wherein said floor panel comprises a substrate and a top layer provided on this substrate, wherein the top layer is at least composed of a print and a transparent thermoplastic layer situated above this print, wherein this floor panel, at least at two opposite edges, is provided with a straight or curved chamfer, with the characteristic that said transparent thermoplastic layer preferably has a thickness of 1 millimeter or less, or even of 0.5 millimeters or less, and that said chamfer extends to below the global level of said print.

The inventor has perceived that the thickness of the thermoplastic top layer could be limited and still an acceptable wear resistance could be obtained by means of a relatively deep chamfer. Possible upward-pushed portions of the top layer then are situated underneath the floor covering, such that no excessive signs of wear will occur. As a chamfer is applied, an impact or friction of the shoe on the edge of the upper surface largely will be avoided, such that also on the new upper edge of the floor panel the risk of accelerated wear is minimized. Moreover, a solution is offered for the plastic-like appearance of the floor panels from the state of the art. By combining a print located close to the surface, preferably less than 0.5 millimeters, with a deep chamfer, preferably deeper than 0.5 millimeters, an exceptional depth effect is created. Problems with the transparency of the thermoplastic layer are avoided to a large extent by limiting its thickness.

According to the most preferred embodiment, said thermoplastic top layer has a thickness of 0.3 millimeters or less.

Said substrate preferably is realized from a material which is harder than said thermoplastic transparent layer. By means of the thermoplastic synthetic material near to or on the surface of the floor panel, a solution is offered for the occurrence of excessive ticking noises. As a harder substrate is chosen, a good composition is obtained, wherein permanent impressions can be minimized. Moreover, said substrate avoids the lining out or migrating of unevennesses on the underlying surface towards said top layer.

Said chamfer can be realized in any manner. Below, some possibilities for the realization thereof are explained.

According to a first possibility, the chamfer is formed by removing a material part of the top layer on the respective edge. Preferably, the removed material part extends through the transparent thermoplastic top layer and the print into an underlying layer and/or into the substrate. According to this first possibility, the print is omitted on at least a portion of the obtained chamfer.

According to a second possibility, the chamfer is formed by locally pressing down a material part of the top layer at the respective edge. By facilitating such pressing down, an underlying layer and/or the substrate may or may not be pre-formed or provided with an incision, which at least partially offers room for the pressed-down material part. Preferably, the print, in this second possibility, extends uninterruptedly from on the actual surface of the floor panel over the entire or approximately entire surface of the chamfer.

Preferably, such chamfer is provided with a separate decorative layer. Such embodiment is particularly interesting in combination with said first possibility, but is also not excluded in combination with said second possibility. Preferably, said separate decorative layer comprises a lacquer layer or a transfer print layer or an otherwise obtained print layer, such as a print layer obtained by means of a digital printing process, such as inkjet printing. In the case of a printing process, preferably UV-based inks are used. The inventor has found that these inks will adhere best to thermoplastic underlying layers. In the case of transfer printing, preferably heated transfer is applied, for example, in that the transfer element, for example, a transfer roller, is heated. In such manner, a good adherence to an underlying thermoplastic layer can be obtained.

As already mentioned, it is possible that in the floor panel of the invention, the chamfer extends through said print. This embodiment is particularly interesting with said first possibility for realizing chamfers.

Preferably, the top layer of the floor panel of the invention further also comprises a back layer, which is situated between said print and the substrate. Said back layer preferably also comprises thermoplastic material, and preferably a filler material, too. This may relate, for example, to a layer of PVC (Polyvinyl chloride), filled with chalk. Preferably, so-called soft PVC is applied, which is produced by means of plasticizers.

For the transparent thermoplastic layer, a PVC-based layer can be applied. Alternatives are, for example, PVdC (PolyVinyl diChloride)-based, PU (PolyUrethane)-based or PP (PolyPropylene)-based layers. As mentioned above, the thermoplastic layer according to the invention preferably has a limited thickness. Good values for the thickness of the transparent thermoplastic layer are situated, for example, between 0.15 and 0.4 millimeters. Preferably, the transparent thermoplastic layer is free from solid additives, such as ceramic particles for promoting the wear resistance, although this kind of particles as such is not excluded. However, the inventor has found that they can be omitted, with the intention of obtaining good transparency, whereas still an acceptable wear resistance is maintained, namely, a wear resistance comparable to or better than that of a laminate panel of the AC2- or AC3-class, as measured according to EN 13329.

As already mentioned, a lacquer layer can be applied as the top layer of the floor panel. Herein, this may relate to a UV- or an electron beam-hardening lacquer layer or to a PU lacquer layer. Preferably, this lacquer layer extends uninterruptedly over the chamfer. This can be realized most simply in combination with the above-mentioned second possibility and is not excluded in combination with the above-mentioned first possibility. Preferably, said lacquer layer is omitted on the surface of a chamfer realized by means of the above-mentioned first possibility.

Said print preferably is provided on a carrier sheet, wherein the carrier sheet, together with the print, forms a printed synthetic film. As synthetic film, preferably a PVC-, PU- or PP-based film is used. The print preferably is performed with solvent inks or with water-based inks. Preferably, in the final floor panel, the carrier sheet is located underneath the print. However, it is not excluded that the print could be situated on the underside of the carrier sheet, wherein then use is made of a transparent carrier sheet, which then effectively forms part of the transparent thermoplastic layer, which as a whole preferably meets the preferred thickness of the present invention.

The whole of the top layer, namely, the print including the possible carrier, the transparent top layer and the possible back layer, preferably consist of an annealed or relaxed thermoplastic layer. The common thickness of the composing layers of the top layers preferably is between 0.5 and 3 millimeters, or still better between 1 and 2 millimeters.

The top layer preferably is assembled prior to connecting it to the substrate. The connection to the substrate can be performed, for example, by means of a glue layer, for example, by means of dispersion glue based on polyurethane. It is not excluded that the top layer is assembled partially or entirely simultaneously with the connection to the substrate. According to another possibility thereof, for example, at least the top layer and/or the backing layer partially can be provided as a liquid or paste-like substance on the substrate, where they are hardened.

The substrate preferably comprises a board material having a density of more than 450 kilograms per cubic meter, or even of more than 650 kilograms per cubic meter. Preferably, said substrate substantially consists of a wood-based material, such as MDF or HDF (Medium or High Density Fiberboard), or for the substrate use is made of another board material on the basis of glued-together wood particles or wood fibers. Such substrate provides for that relatively stiff or rigid panels are obtained, which can be gluelessly installed in a smooth manner.

Preferably, the substrate has a thickness of 2 to 10 millimeters. The entire floor panel preferably has a thickness situated between 5 and 15 millimeters. Preferably, the substrate forms at least half of the thickness of the floor panel.

On the lower side of the substrate, a backing layer or sublayer, preferably a vapor-tight layer, can be provided. Such backing layer or sublayer preferably consists of a thermoplastic synthetic material layer and/or of a hot-melt glue. The backing layer preferably has a thickness corresponding to the thickness of the top layer, including a possible back layer, however, preferably is made thinner.

In the cases where a back layer or other intermediate layer is applied between the print and the substrate, two floor panels, in an installed condition of two of such floor panels, preferably have a contact surface formed on the respective back layers or intermediate layers, wherein this contact surface extends underneath the deepest point of the respective chamfers. Such contact can form a first barrier against moisture which would penetrate into the seam or joint between two floor panels. Said back layers or intermediate layers preferably comprise a compressed portion at the location of the contact surface.

Preferably, the invention is applied with floor panels which, at the respective edges, are provided with mechanical coupling means allowing that two of such floor panels can be coupled to each other, such that a locking is obtained in a vertical direction perpendicular to the plane of the coupled panels, as well as in a horizontal direction perpendicular to the coupled edge and in the plane of the panels. Preferably, the coupling means also show one or a combination of two or more of the following features:

- the feature that the mechanical coupling means or coupling parts substantially are realized as a tongue and a groove bordered by an upper lip and a lower lip, wherein this tongue and groove substantially are responsible for the locking in said vertical direction, and wherein the tongue and groove are provided with additional locking parts, substantially responsible for the locking in said horizontal direction. Preferably, the locking parts comprise a protrusion on the lower side of the tongue and a recess in the lower groove lip. Such coupling means and locking parts are known, for example, from WO 97/47834;
- the feature that the mechanical coupling means or coupling parts press the coupled floor panels against each other, for example, in that these mechanical coupling means are realized with a so-called pretension, as is known as such from EP 1 026 341. The tensioning force with which the floor panels are pressed against each other or towards each other, can be obtained, for example, in combination with the above feature, by means of a lower lip, which is bent out in coupled position, which, in an attempt of springing back, presses against the lower side of the tongue. The invention is particularly interesting for being applied with such floor panels, as there the risk is increased that the thermoplastic layer is pushed upward at the edges as an effect of the tensioning force. Preferably, here the aforementioned preferred embodiment is used, wherein underneath the chamfer a contact surface is formed on an intermediate layer or back layer. The tensioning force, together with a possible compression at the location of the contact surface, leads to a good resistance against moisture penetration;
- the feature that the mechanical coupling means allow a coupling by means of a horizontal, or quasi-horizontal, shifting movement of the panels towards each other. With this type of panels, there is a risk of the thermoplastic layer being pushed upward near the panel edges, to wit at the end of the coupling movement, when the edges would bump against each other. By applying the invention, this risk is reduced;
- the feature that the mechanical coupling means allow a coupling by means of a turning movement W along the respective edges. With this type of panels, there is a risk of the thermoplastic layer being pushed upward near the panel edges during the coupling movement, when the edges should turn against each other. By applying the invention, this risk is reduced;
- the feature that the mechanical coupling means allow a coupling by means of a downward-directed movement of a male coupling part having, for example, a tongue, into a female coupling part having, for example, a groove. With this type of panels, there is a risk of pushing up the thermoplastic layer near the panel edges during the coupling movement, when the edges would chafe along each other. By applying the invention, this risk is reduced;
- the feature that the mechanical coupling means, or at least the pertaining upper edge, is realized by means of a milling treatment with rotating milling tools. The use of milling tools can lead to the occurrence of pushed-up edges already during manufacture of the floor panels. By applying the invention, this risk is reduced.

Preferably, said coupling means substantially are realized in said substrate. Preferably, said coupling means are provided by means of a milling treatment with rotating milling tools. Preferably, the floor panel of the invention relates to a rectangular, either oblong or square, panel, which is provided with mechanical coupling means on both pairs of opposite edges.

Preferably, the chamfers on both opposite edges are made identical or approximately identical.

The chamfer which is applied according to the invention, preferably, globally seen, has an angle of 35 to 55° with the panel surface, wherein an angle of approximately 45° is optimum. Smaller angles than 35° lead to wide edges, whereas larger angles are disadvantageous in that they have a higher risk of being pushed up when the floor is being walked on.

Preferably, the chamfers, in a coupled condition of two floor panels with the characteristics of the invention, form a V-groove, wherein the width of the possible bottom of this V-groove is less than one fifth and still better less than one seventh of the width of the opening of the V-groove at the upper surface of the coupled panels.

Preferably, the chamfers, in a coupled condition of two floor panels with the characteristics of the invention, form a V-groove, wherein the width of the possible bottom of this V-groove is smaller than the depth of the respective V-groove. Preferably, the width of the possible bottom is less than half of the depth of the respective V-groove.

The herein above-mentioned characteristic preferred embodiments of the chamfers or V-grooves of the invention, each individually, however, preferably in combination, are ideal for being applied with prints representing a wood pattern.

Preferably, the floor panel of the invention further is characterized in that said floor panel is made rectangular and oblong and that said chamfer is at least or exclusively provided on the long pair of opposite edges. Of course, such chamfer can be provided also or only on the short pair of opposite edges.

According to a particular embodiment, said chamfer, seen in cross-sections transverse to the respective edge, has a geometry varying along the respective edge. Preferably, this chamfer, over the major part of the length of the respective edge, or over the entire length thereof, has the inventive feature that this chamfer extends to below the global level of the print. The varying geometry preferably comprises at least a variation of the global angle over which the chamfer extends.

According to another particular embodiment, said substrate is made waterproof at least at the respective edge, or at least measures have been taken at the respective edge for obtaining an increased resistance against moisture or moisture penetration in the substrate. This can be realized in different possible manners, for example, in that the substrate as such is waterproof, in that the substrate, at the respective edge, is provided with a covering by means of a water-repellent substance, or in that the substrate comprises a synthetic edge portion at the respective edge.

According to a second independent aspect, the present invention relates to a floor panel which can offer, amongst others, installation advantages. To this aim, the invention, according to its second independent aspect, also relates to a floor panel, wherein this floor panel is made rectangular and oblong and comprises a substrate and a top layer provided on this substrate, wherein the top layer is composed at least of a print and a transparent thermoplastic layer situated above this print, with the characteristic that the floor panel has a length of more than 180 centimeters and wherein the floor panel preferably further comprises means for limiting the bending by its own weight. As longer floor panels are used, a surface can be installed with less operations. The means which limit the bending allow improving the installation advantage even more. Namely, by the reduced bending, it is simpler to market and/or install the panels, certainly in the case when use is made of panels which, at least at one pair of opposite edges, are provided with mechanical coupling means, which, for installation, must be provided in each other. Preferably, finally a bending is obtained of less than 50 centimeters per meter, or even of less than 25 or less than 10 centimeters per meter.

The means which limit the bending can comprise one or a combination of two or more of the following measures:
- the measure wherein at least one layer of the floor panel has a density of more than 650 kilograms per cubic meter, or even of more than 750 kilograms per cubic meter;
- the measure wherein the floor panel has a thickness of 5 millimeters or more;
- the measure wherein the floor panel comprises at least one embedded glass fiber layer, wherein this glass fiber layer is situated outside of the neutral fiber;
- the measure wherein the floor panel comprises at least one embedded profile, wherein this profile globally extends in the longitudinal direction of the floor panel and wherein this profile, in the case that coupling parts in the form of a tongue and groove are provided, preferably is situated closer to the tongue than to the groove.

Preferably, the print of the floor panel shows a wood pattern, which preferably extends with the pore direction in the longitudinal direction of the floor panel. Preferably, the wood pattern, at least in the longitudinal direction and preferably also in the width direction of the floor panel, is free from repetitions.

Preferably, here this relates to a print provided on a carrier sheet, for example, a printed synthetic material film. Such synthetic material film can consist substantially of PVC (Polyvinyl chloride), PU (Polyurethane) or PP (Polypropylene).

The print preferably is applied by means of an offset printing process on said carrier sheet or possibly direct on the underlying substrate or the possible back layer. However, it is not excluded that a digital print might be applied, for example, by means of an inkjet printing device. As inks, preferably UV-based or solvent-based inks are applied. It is not excluded that water-based inks might be applied. Preferably, an ink on the basis of pigments is applied. Preferably, printing is performed on a web or roll of such synthetic film, back layer or on a larger board of the underlying substrate material, wherein said pore direction preferably extends transverse to this web. So, with offset printing or other printing processes in which printing cylinders are applied, a motif can be obtained without repetitions in the longitudinal direction of the floor panel, even with floor panels having a length of 1.8 meters or more.

The use of fast-drying inks, such as inks on the basis of pigment, enable such technique, also in offset printing, for printing on an underlying synthetic material layer, such as on the synthetic material film, the back layer, or an underlying substrate on the basis of synthetic material. In particular, UV- or solvent-based inks are suited for this purpose. At least with the use of water-based inks, preferably after each printing cylinder or print head, in the case of digital techniques, an appropriate drying technique is applied. With such transversely printed wood patterns on an underlying synthetic material layer, fast drying is of importance for obtaining a good resolution, for example, a resolution of more than 250 dots per inch, or still better of more than 500 dots per inch.

It is clear that such printed web of synthetic film, back layer or printed larger board of substrate material can be applied for manufacturing a plurality of floor panels, by subdividing the respective layers or boards.

Preferably, the floor panel has a relief on its surface, which is made corresponding to said print, such that a so-called embossed-in-register structure is obtained.

It is evident that in the floor panel of the second aspect, the materials and composition of the first aspect can be applied for the substrate, the top layer, the print, the back layer and/or the underlying layer, without herein necessarily applying a chamfer. Also, the coupling means and locking parts mentioned there can be applied. Of course, it is not excluded to combine a chamfer according to the first aspect with a floor panel showing the characteristics of the second aspect.

According to all aspects, it is possible that the substrate substantially consists of a thermoplastic material. So, for example, a vinyl-based substrate, such as PVC, a polyethylene-based substrate, a polypropylene-based substrate or a polyurethane-based substrate can be applied. These materials have a good resistance against water or moisture and are readily available. Preferably, the substrate substantially consists of a foamed synthetic material board. Preferably, in that case synthetic material of the closed-cell type is concerned. By foaming, by means of an amount of synthetic material comparable to that of the floor panels of EP 1 938 963, a thicker and stiffer substrate is obtained, such that the risk of the occurrence of migration effects from the underlying layer to the surface of the floor covering can be minimized.

It is not excluded that soft PVC could be applied for the substrate 6. To those skilled in the art, soft PVC is known as a material which is obtained on the basis of PVC and plasticizers and which has a density of less than 1.35 grams per cubic meter.

Preferably, the transparent thermoplastic layer mentioned in the various aspects substantially consists of PVC and/or plasticizer. Preferably, for the manufacture of this layer, use is made of a paste containing a percentage of plasticizer situated between 5 and 75 percent by weight. Preferably, said transparent or translucent layer has a Shore A hardness situated between 50 and 100.

It is clear that, where "hardness" is mentioned, the hardness is intended of the surface of the respective layer, substrate, or other material, measured on a flat side thereof, namely, the side thereof which is directed upward in the final floor panel, or the side which is relevant for the occurrence or non-occurrence of permanent impressions.

According to all aspects, the present invention preferably relates to floor panels or other panels which as such are rigid and thus can not be wound up. Preferably, the final panel shows a thickness of more than 5 millimeters, however, preferably of less than 15 millimeters. A good value for the thickness is 7 to 10 millimeters. Such panels are very suitable for providing mechanical coupling means thereon, which allow to connect two or more such panels to each other at their edges. It is clear that also the possible larger boards, from which a plurality of such floor panels are formed, and the substrates as such are rigid. Preferably, the floor panels, boards and substrates are so rigid that they will bend less than 10 centimeters per meter under their own weight.

According to all aspects, the floor panels preferably have a width of 8 centimeters or more. Particularly preferred dimensions are a width situated between 14 and 22 centimeters and a length situated between 118 and 220 centimeters.

It is clear that according to the invention, by "substrate" an internal layer of the floor panel itself is meant, which as such can be made single- or multi-layered, however, wherein the respective layer or layers preferably have an overall thickness which is larger than half of the thickness of the entire respective panel and/or wherein the respective layer or layers have an overall weight which preferably is higher than half of the weight of the entire respective panel. Preferably, the contour of the respective coupling parts is substantially or entirely realized in the substrate.

Preferably, the possible intermediate layer or back layer extends above the horizontal level determined by a center line of the floor panel, and still better above the center line of the possible coupling parts, such as above the center line determined by the tongue-in-groove coupling. Preferably, the possible intermediate layer or back layer extends above the coupling parts which for the major part are responsible for the vertical locking. These coupling parts namely are preferably realized in the substrate.

BRIEF DESCRIPTION OF THE DRAWINGS

With the intention of better showing the characteristics of the invention, hereafter, as an example without any limitative character, some preferred embodiments are described, with reference to the accompanying drawings, wherein:

FIGS. 7 to 10 represent various possibilities for realizing a chamfer in a view on the area indicated by F7 in FIG. 2;

FIGS. 11 and 12, in a view similar to that of FIGS. 3 and 5, represent still more variants;

FIGS. 13 and 14, in a view similar to that of the right-hand part of FIG. 4, represent another possibility for realizing a floor panel having the characteristics of the invention;

FIG. 15 illustrates a method having the characteristics of a third aspect of the invention, which will be described in more detail below;

DETAILED DESCRIPTION OF VARIOUS EMBODIMENTS

Figure 1:
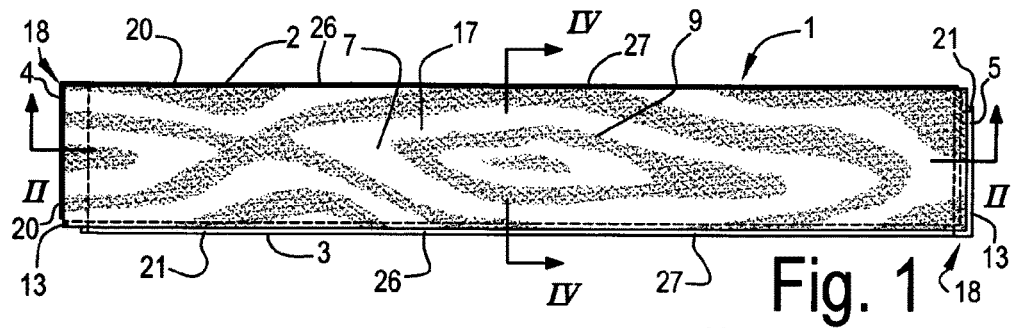
FIG. 1 represents a panel, more particularly a floor panel, with the characteristics of, amongst others, the first aspect of the invention.

FIG. 1 represents a floor panel 1 with the characteristics of, amongst others, the first aspect of the invention. In this case, this relates to a rectangular and oblong floor panel 1 with a pair of long sides or edges 2-3 and a pair of short sides or edges 4-5.

Figure 2:
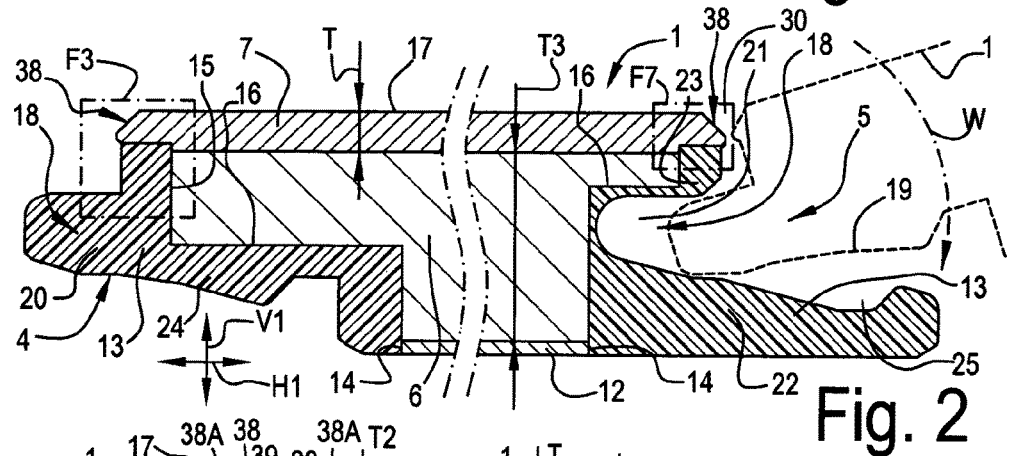
FIG. 2 in cross-section represents a view according to the line II-II represented in FIG. 1.

FIG. 2 represents that the floor panel 1 is of the type which comprises at least a substrate 6 and a top layer 7 provided thereon. In the example, the top layer 7 has a thickness T of at least 0.5 millimeters. Here, specifically an annealed thermoplastic top layer is concerned, which substantially consists of PVC.

Figure 3:
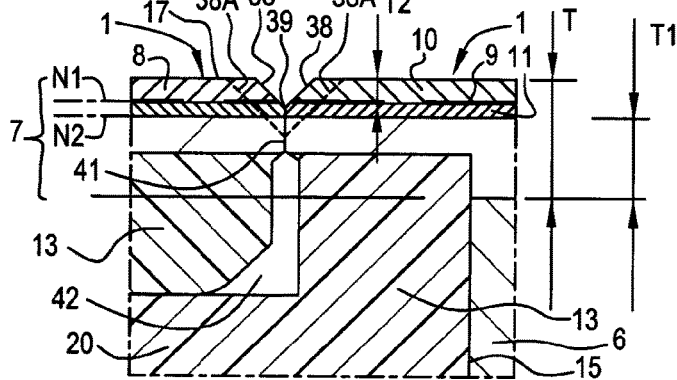
FIG. 3, at a larger scale, represents a view on the area indicated by F3 in FIG. 2.

FIG. 3 shows that the thermoplastic top layer 7 preferably as such is composed of a back layer 8, a provided thereon motif 9 and a transparent thermoplastic layer or wear layer 10. Herein, the back layer 8 preferably covers a thickness T1 of more than 45 percent of the overall thickness T of the top layer 7. In this case, the back layer 8 consists of a layer of soft recycled PVC, which is filled with chalk. In this case, the back layer 8 as such has a higher density than said transparent or translucent layer 10. In this case, the motif 9 is provided on a carrier 11. In this case, this relates to a printed PVC film. For the transparent thermoplastic layer or wear layer 10, preferably a PVC layer with a thickness T2 of minimum 0.2 millimeters is applied. Preferably, the PVC layer is not thicker than 0.5 millimeters. The inventors have found that a thickness T2 of 0.15 to 0.4 millimeters effects a good war resistance, even when it should be substantially free from solid additives, such as ceramic particles, for example, aluminum oxide particles, which as such would effect an increase of the wear resistance. The overall thickness T of said top layer 7 preferably is between 0.5 and 3 millimeters, wherein a thickness T of 1 to 2 millimeters is desirable. In the cases where no use is made of a back layer 8, the overall thickness of the top layer 7 of course may be thinner, for example, a thickness situated between 0.2 and 1 millimeter, for example, a thickness of approximately 0.5 millimeters.

For the substrate 6 of the floor panel 1 of FIG. 1, use is made of a substrate 6, which comprises wood particles, in this case, wood fibers, bonded with a binding agent, such as MDF or HDF. Preferably, the applied substrate material has a residual moisture content of less than 10 percent by weight. Instead of MDF or HDF, also a substrate having a low density can be chosen, for example, of less than 600 kilograms per cubic meter. This may relate, for example, to a wood-based material which comprises wood fibers, which are obtained from recycled wood and which also are bonded with a binding agent. Also, a wood particle board may be opted for.

At the lower side of the substrate 6, there is an underlying layer 12 or backing layer. In this case, the backing layer comprises thermoplastic synthetic material. Preferably, for the backing layer or underlying layer 12, PVC, preferably recycled PVC, is applied, filled with chalk or hot-melt glue. In principle, for the backing layer or underlying layer 12, a similar composition can be applied as for the back layer 8 situated in the top layer 7. Of course, also another, preferably vapor-tight layer can be chosen, certainly in the cases in which no back layer 8 is present, or in the cases where use is made of an annealed or relaxed thermoplastic top layer. Such vapor-tight backing layer or underlying layer can consist, for example, of a substance applied in liquid condition, which hardens on the lower side of the substrate, for example, a vinyl-based substance or a hot-melt glue, which then preferably is based on polyurethane.

The substrate 6 preferably is made pigmented in a color corresponding to the color of said back layer 8, for example, both the substrate 6 and the back layer 8 in black, or both in white.

The floor panel 1 from FIGS. 1 to 4 shows an edge portion 13 of synthetic material on at least one edge 4, in this case on both opposite edges of the short pair of sides 4-5, wherein said synthetic material is different from the substrate material 6. This synthetic material concerns a measure for obtaining an increased resistance against moisture or moisture penetration in the substrate material 6. In this case, the synthetic material extends at least over 80 percent of the thickness T3 of the substrate. The attachment of the edge portion 13 to the substrate material 6 is obtained by hardening said synthetic material on the respective portion of the substrate material 6. In this case, by the hardening of the synthetic material, also an adherence is obtained to the lower side of the top layer 7 and to the lateral edges 14 of the backing layer 12. This latter is not necessarily the case. So, for example, either the top layer 7 or the backing layer 12 can be glued against the upper side or lower side, respectively, of the edge portion 13.

FIG. 2 represents that the connection between the edge portion 13 and the substrate material 6 extends over a boundary surface 15, which comprises partial surfaces 16 extending transverse to the normal of the surface 17 of the panel 1. In this case, the respective partial surfaces 16 respectively extend approximately horizontal. However, this is not necessarily so, and inclined partial surfaces and/or curved boundary surfaces can be used.

The example also illustrates that the respective edges 4-5 of the substrate material 6 can be formed exclusively from said edge portion 13. In those cases, an appropriate complete protection of the substrate material 6 is obtained on the respective edges 4-5.

For the synthetic material of the edge portions 13, use is made of a material obtained on the basis of a two-component system. Preferably, a polyurethane is applied, obtained on the basis of the components polyol and isocyanate. By means of this material, a chemical bond to the wood particles of the substrate 6 can be obtained. Moreover, the polyurethane preferably has the features of a thermo-hardening polymer.

FIG. 2 represents that the respective edges 4-5 are made with a profile and that this profile comprises coupling means 18, with which this panel 1 can be coupled to other similar panels 1, as represented in dashed line 19. In the coupled condition, not represented here, a locking is effected in a horizontal direction H1 perpendicular to the edge and in the plane of the panel 1, as well as in a vertical direction V1 perpendicular to the plane. The coupling means 18 represented here substantially are made as a tongue 20 and a groove 21, bordered by a lower lip 22 and an upper lip 23. For obtaining the locking in horizontal direction H1, the tongue 20 and groove 21 are provided with cooperating locking parts 24-25, in this case in the form of a protrusion 24 on the lower side of the tongue 20 and a recess 25 in the lower groove lip 23. In this case, the tongue profile can be introduced into the groove 21 at least by means of a turning movement W along the respective edge for obtaining the coupled condition. Preferably, the coupling means 18 also allow other coupling movements, such as a coupling by means of a substantially horizontal shifting movement of the panels 1 towards each other.

It is clear that also on the long sides 2-3 of the floor panel 1, use can be made of edge portions 13, as illustrated by means of FIG. 2.

Figure 4:
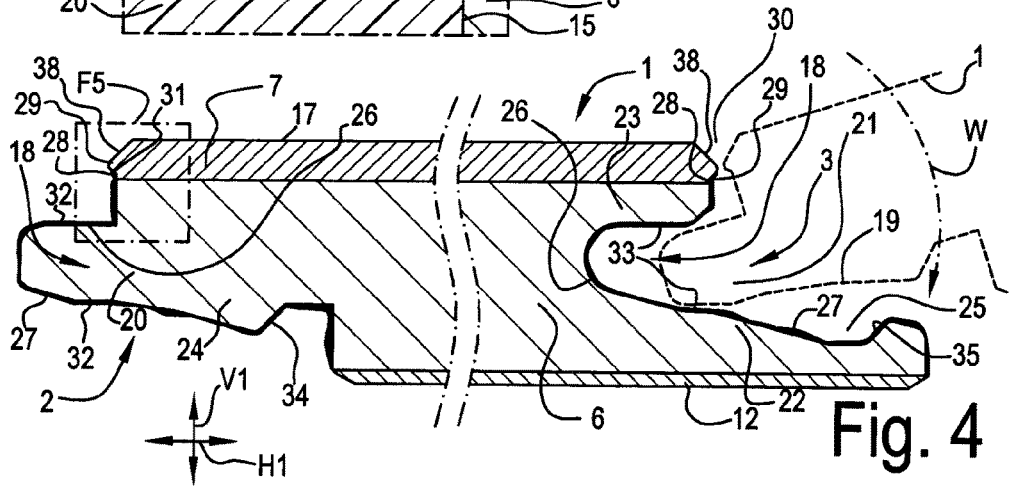
FIG. 4 in cross-section represents a view according to the line IV-IV represented in FIG. 1.

FIG. 4 represents that on the other pair of opposite edges 2-3, in this case on the long sides 2-3 of the floor panel 1, other measures are performed for obtaining an increased resistance against moisture or moisture penetration in the substrate thereof. The substrate has a profile 26 on the respective edges 2-3, and on this profile 26, a moisture-repellent or sealing covering layer 27 is applied, in this case a hot-melt glue, which can be based, for example, on polyurethane.

In the example, this covering 27 extends along the long sides 2-3 of the floor panel 1 at least over the entire distance between the edge portions 13 of the short pair of edges 2-3. Herein, this relates to a covering 27, which has been applied calibrated at least on a portion of the profiled edge region or profile 26, such that the present thereon coupling means 18 and locking parts 24-25 are not or almost not hindered when performing the coupling movement.

A particularity of the covering layer 27 represented here is that it extends over the profile 26 up to a lateral surface 28 of said top layer 7. This is illustrated lucidly by means of FIG. 5. Moreover, the covering layer, at least on one of the long edges, in this case on both long edges 2-3, is provided in an undercut 29 performed in said lateral surface 28. By means of this measure, it is effected that in coupled condition a gap of less than 0.2 millimeters is obtained between the upper edges 30 of the panels 1, and in this case even no gap.

The covering 27 maximally extends to a point 31 at a distance from the upper edge 30 or decorative side 17 of the respective panel 1. At this point 31, the covering 27 is countersunk at least partially, in this case even completely, in said recess 29.

Generally, the point 31 preferably is situated in said recess 29 provided in the lateral surface 28 of the top layer 7. Preferably, said recess extends substantially or even entirely underneath the motif 9 of the top layer 7, such as it is the case here.

In the example of FIG. 4, the covering 27 is applied at least calibrated on a portion of the profiled edge region or the profile 26, which, in a coupled condition of two such panels 1, forms a contact surface 32-33-34-35. In the present case, this is provided at least calibrated on the contact surfaces 32-33 responsible for the vertical locking V1 and on the contact surfaces 34-35 responsible for the horizontal locking H1.

According to the example of FIG. 4, on the long pair of opposite edges 2-3 similar coupling means 18 are applied as on the short pair of opposite edges 4-5, in that they also allow a coupling at least by means of a turning movement W along the respective edges. However, this is not necessarily so, and it is possible that coupling by turning is only possible on the long pair of edges 2-3, whereas the short pair of edges 4-5, for example, allows at least a coupling by means of a substantially horizontal or downward coupling movement N of the respective edges 4-5 towards each other. Such embodiment is represented on FIG. 6.

Figure 6:
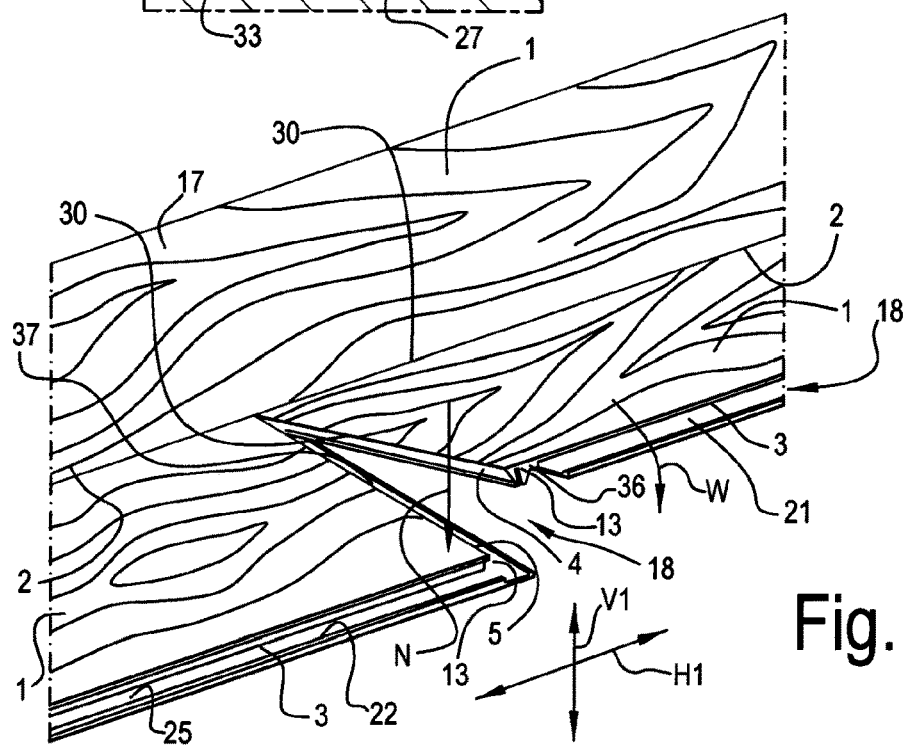
FIG. 6 in perspective represents a possible manner of coupling floor panels having the characteristics of the invention.

The floor panel 1 of FIG. 6 is provided, on the short pair of edges 4-5, with coupling means 18, which allow a coupling by means of a downward movement N of the coupling means on the one edge 4 in the coupling means on the other edge 5. Herein, the coupling means 18 are realized as a male coupling part 36 and a female coupling part 37, wherein the male coupling part 36 can be provided in the female coupling part 37 by means of said downward movement N.

FIG. 6 illustrates how these panels 1 can be coupled, wherein these panels 1, on the long sides 2-3, are provided with coupling means 18, which allow at least a coupling by means of a turning movement W, and, on the short sides 4-5, are provided with coupling means 18, which allow at least a coupling by means of a downward movement N. As represented, they can be engaged into each other by means of a single fold-down movement N, wherein the long sides 2-3 are turned into each other and automatically a downward coupling movement N is created on the short sides 4-5. With the turning on the long sides 2-3, as well as with the automatic downward movement N on the short pair of edges, there may be a contact between the upper edges 30 of the floor panels, by which a bulging of the thermoplastic material of the wear layer 10 can occur at the location of these upper edges 30. The present invention can minimize the risk of the occurrence of such bulging edges.

The particularity of the present invention according to its first aspect is that, as clearly illustrated by means of FIGS. 1 to 5, the floor panel 1, at least at two opposite edges 2-3, is provided with a chamfer 38, in this case a straight chamfer. In the examples, this chamfer 38 is combined with a relatively thin transparent thermoplastic layer or wear layer 10, which, for example, has a thickness T2 of approximately 0.3 millimeters. Herein, the chamfer 38 extends to below the global level N1 of the print 9 and preferably to below the global level N2 of the printed film or the carrier 11. In the represented cases, this each time relates to a chamfer 38 realized by means of the first possibility therefor mentioned in the introduction. Hereby, the print 9 is omitted on a portion of the surface of the chamfer 38. The represented chamfers 38-38A form an angle A of approximately 45° with the panel surface or the decorative side 17. In a coupled condition of two of such floor panels 1, as represented here, a V-groove is created. In this case, the bottom 39 of the V-groove is formed by a line, or, seen in this cross-section, by a point, and thereby clearly is less wide than one fifth of the width B1 of the opening of the V-groove at the upper surface or the decorative side 17 of the coupled panels, and also is less wide than the depth D1 of the V-groove.

In the example of the FIGS. 1 to 5, such chamfer 38 is provided on all edges 2-3-4-5 of the rectangular and oblong floor panel 1. According to variants, such chamfer 38, for example, can be omitted on the short pair of edges 4-5. It is also noted that in FIG. 3 in dashed line a chamfer 38A is represented, which extends to below the global level N2 of the carrier 11, whereas the chamfer 38 represented in solid line indeed extends to below the global level N1 of the print 9, however, not to below the global level N2 of the carrier.

Figure 5:
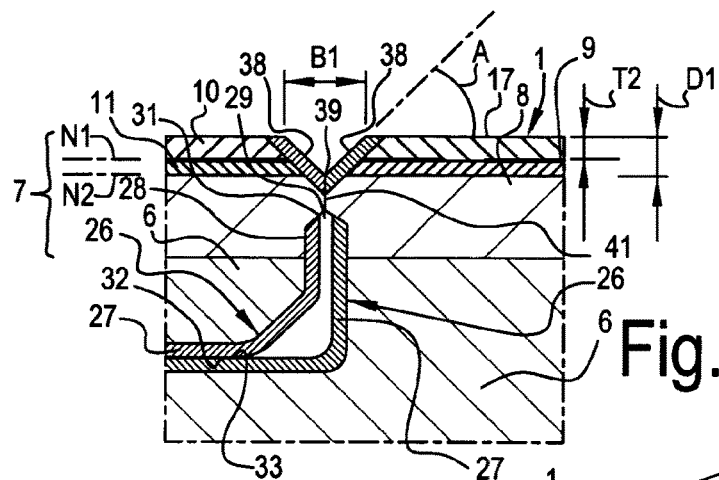
FIG. 5, in a view similar to that of FIG. 3, represents a variant.

FIG. 5 represents that such chamfer 38 can be provided with a separate decorative layer 40, for example, with a lacquer layer or transfer print layer. Underneath the deepest point or the bottom 39 of the respective chamfers 38 of the coupled panels 1, a contact surface 41 is created on the back layers 8. Preferably, herein at the location of the contact surface 41 a compression of the material of the back layer 8 will take place. The contact surface 41 is active in the locking in said horizontal direction H1. In the examples, a, seen in cross-section, closed chamber or cavity 42 is situated underneath this contact surface.

The examples of chamfers 38-38A listed up herein above are realized by means of the first possibility thereof mentioned in the introduction.

Figure 7:
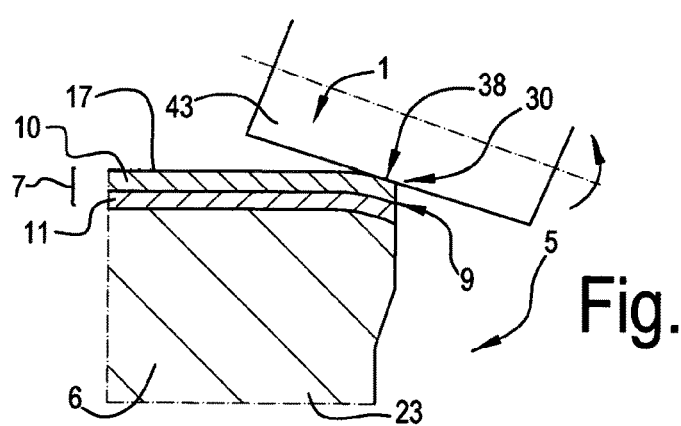

FIG. 7 represents a possibility for realizing a chamfer 38, wherein in this case the second possibility mentioned introduction is applied. The respective chamfer is formed by locally pressing down the top layer 7 at the respective edge 5. Herein, a pressing element 43, in this case a rolling element 43, is applied, which possibly can be heated. It is also possible to heat up the transparent thermoplastic layer 10 prior to pressing down, for example, by means of an infrared beam device, wherein then possibly use can be made of a press element 43 which is only slightly heated, for example, to maximum 40° C. or 35° C., with an unheated one, thus, on room temperature, or with one which is cooled down below room temperature, for example, maximum to 15° C. In connection with FIG. 7, it is also noted that the pressing down in this case also results in a local compression of the substrate 6. Instead of the substrate 6 or in combination therewith, also the possible back layer 8, which is not represented here, can be compressed locally.

FIGS. 8 and 9 also represent an example of said second possibility for realizing a chamfer 38. In order to facilitate the pressing down, in this case the substrate 6 is provided with an incision 44, which at least partially offers room for the pressed-down material part. Of course, glue 45 can be provided in the incision in order to minimize or prevent the springing back of the pressed-down upper edges 30. It is possible that the lateral edge 46 of the chamfer 38 has to be post-treated in order to obtain a good adjoining of the floor panels 1, for example, by providing a lateral edge 46A extending perpendicular to the global decorative side 17, such as represented by the dashed line, for example, by means of a cutting treatment.

FIG. 10 represents another example of the aforementioned second possibility for realizing a chamfer 38. What is represented is a larger board of substrate material comprising at least the substrates 6 of two floor panels 1. These floor panels 1 are obtained, amongst others, by subdividing from the larger board. Herein, an amount 47 of material will be lost, situated between the finally realized profiled edges 4-5 of the respective floor panels 1. In order to facilitate the pressing down, the substrate 6 is pre-formed. To this aim, at the height of the chamfers 38 to be provided, a recess 48 or impression is provided in the final decorative side 17, here represented in dashed line. The composing layers 9-10-11 of the top layer 7 are connected with the pre-formed substrate 6 via an adhesive layer 49, for example, a polyurethane dispersion glue. Prior to gluing, the composing layers 9-10-11 mutually already can be adhered to each other, for example, melded or otherwise laminated. Of course, it is also possible that the composing layers comprise a back layer 8, however, this is not represented here. For obtaining a good pressing-on of the composing layers 9-10-11 on the substrate 6, it is possible to work, such as here, with a press element 50, which comprises protrusions 51 corresponding to the recesses 48. Such press element 50 can also be applied without pre-deforming the substrate 6, wherein then during pressing possibly a compression of the substrate material can be obtained.

In the examples of FIGS. 7 to 10, it is respectively obtained that the print 9 extends uninterruptedly from on the surface or the decorative side 17 of the floor panel 1 over the entire or approximately the entire surface of the chamfer 38.

The possible superficial lacquer layer, for example, a UV-hardening lacquer layer, can be provided and/or hardened on the floor panel before or after realizing the chamfer 38, according to which possibility this chamfer 38 then also is realized. For example, in the case of the second possibility, it can be advantageous to provide and/or harden the lacquer layer only after realizing the chamfer 38. Namely, a hardened lacquer layer might burst when being pressed down together with the transparent thermoplastic layer 10.

FIG. 11 represents other floor panels with a chamfer 38 similar to that of FIG. 5, but which is made curved and globally extends according to an angle A of approximately 40° with the panel surface or the decorative side 17.

FIG. 12 represents other floor panels with a chamfer 38, wherein these floor panels 1 in coupled condition show a V-groove formed by the chamfers 38, and wherein the bottom 39 of this V-groove shows a width B2 which is smaller than one third of the width B1 of the opening of the V-groove at the decorative side 17 of the coupled floor panels 1.

FIG. 13 represents an example, wherein also measures have been taken for obtaining an increased resistance against moisture or moisture penetration in the substrate 6. In this case, use is made of a covering layer 27 on the basis of a water-repellent substance. The covering 27 initially can be formed on an incompletely performed profile 26 of the edge portion. In this case, the final upper edge 30 of the respective edge region still is to be formed by cutting the final lateral surface 28 of the top layer 7 according to the dashed line 52 and by forming the surface of the chamfer 38 in order to remove in this manner an excess material portion 53 from this top layer 7. FIG. 14 shows the obtained result, wherein the floor panel 1 is provided with a chamfer 38 on the respective edge.

FIG. 13 clearly shows that the covering layer 27 in this case initially, thus, prior to performing the cutting treatment which forms the chamfer, extends at least from on the substrate 6 onto the lateral surface 29 of the top layer 7. By the cutting treatment, which has to be performed subsequently, for forming the chamfer, an excess portion of this covering layer 27 is removed. It is noted that the edge of the top layer 7 extends distally over the surface of the chamfer. Thereby, the top layer 7 forms a barrier against possible soiling of the surface or decorative side 17, and it is possible to achieve a smoother production of such floor panels 1.

It is evident that at the opposite edge 4 of the edge 3 represented in FIGS. 13 and 14, preferably a similar treatment is performed, however, with this difference that this opposite edge 4 preferably comprises the complementary coupling means 18, in this case, a coupling means in the form of a tongue.

Further, it is clear that in FIGS. 13 and 14 the first possibility for forming the chamfer 38 is applied.

FIGS. 7 to 10 and 15 further illustrate a third independent aspect of the invention. According to this third aspect, the invention also relates to a floor panel 1 with a thermoplastic top layer 7, wherein this floor panel 1 comprises a substrate 6 and a top layer 7 provided on this substrate 6, wherein the top layer 7 is at least composed of a print 9 and a transparent thermoplastic layer 10 situated above said print 9, with the characteristic that said print 9 globally extends in a horizontal level N1, however, comprises parts which extend below said level N1. In the case of the FIGS. 7 to 10, this relates at least to parts of the print 9 on the surface of the chamfer 38, which extend below the level N1. In the case of FIG. 15, the floor panel 1 also comprises portions extending below the level N1 in the internal part of the decorative side 17. These portions may relate to imitations of removed material parts, such as it may be the case when imitating scraping traces in wooden floor panels, or imitations of joints, cracks or gaps, or imitations of wood knots or other strongly pronounced relief of wood and/or stone. It is clear that such floor panel 1 offers new possibilities for imitating strongly structured floors. The third aspect, for example, allows still forming deep structures with panels of which the transparent thermoplastic layer 10 has a limited thickness T2, for example, a thickness of less than 1 millimeter, or even of less than 0.5 or less than 0.3 millimeters. As already mentioned, it is advantageous to limit the thickness T2 of the transparent thermoplastic layer 10.

According to preferred embodiments of the third aspect, the motif or the print 9 can also extend to below the global level N2 of the lower side of the possible carrier 11 of the print 9 and/or into the substrate 6 and/or an underlying back layer. To this aim, the back layer 8 and/or the substrate 6 may or may not be pre-formed. Possibly, a compression of the material of this back layer 8 and/or substrate 6 takes place there, where the print extends at least to below the global level N1 and/or N2.

There, where a global level is mentioned, respectively the horizontal level is meant, wherein the sum of the square deviations of the actual level of the respective layer in the floor panel is minimal in respect to this horizontal level. In other words, this relates to the smallest square horizontal area best approaching the respective layer.

In FIG. 15, the top layer 7 is represented schematically as a single layer. However, it is clear that the top layer 7 preferably is composed of several layers, such as at least of a carrier sheet 11, a print 9 and a transparent thermoplastic layer 10.

It is clear that the third aspect can be combined with the first aspect and/or the second aspect of the invention or the preferred embodiments thereof. According to the second and third aspect, it is not necessary, however, also not excluded to apply a chamfer 38, whether or not according to the first aspect. However, this second and third aspect in fact can adopt one or more of the other characteristics mentioned within the scope of the first aspect, such as, for example, the characteristics of the coupling means, locking parts, top layers or the like mentioned there.

Figure 16:
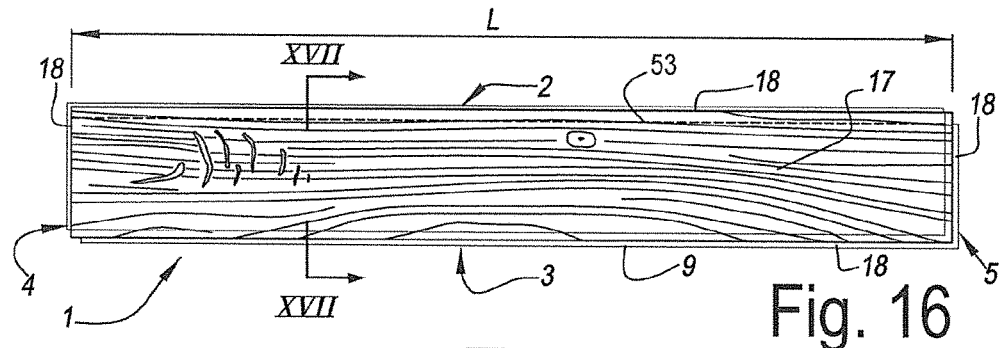
FIG. 16 represents a floor panel having the characteristics of the second aspect of the invention mentioned in the introduction.
Figure 17:
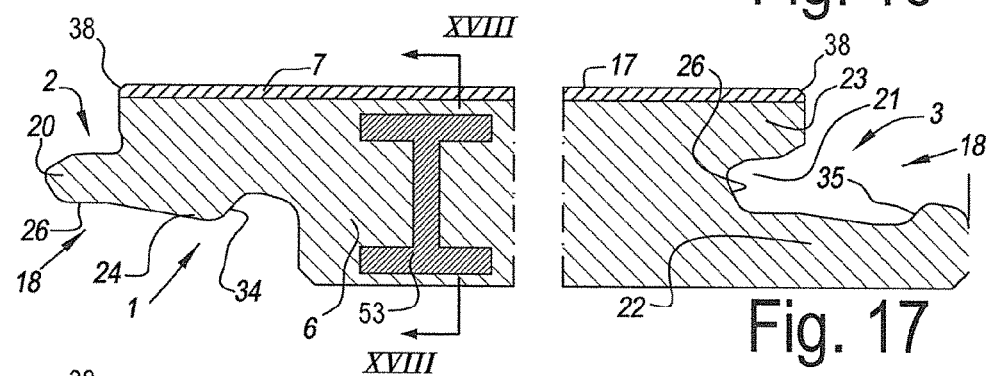
FIG. 17 represents a cross-section according to the line XVII-XVII represented in FIG. 16.

FIG. 16 represents an example of a floor panel 1 having the characteristics of the second aspect of the present invention mentioned in the introduction. Herein, this relates to a rectangular and oblong floor panel 1. FIG. 17 represents that this floor panel 1 comprises a substrate 6 and a top layer 7 provided on this substrate 6. As a top layer 7, the top layers 7 mentioned in connection with the first aspect can be applied, namely top layers 7 having at least a print 9 and a transparent thermoplastic layer 10 situated above said print 9. For simplicity's sake, in FIGS. 16 through 20 the top layer 7 is represented as a single layer. The particularity of the floor panel of FIG. 16 is that it has a length L of more than 180 centimeters. The print 9 represents a wood pattern, the pores of which extend globally in the longitudinal direction of the floor panel 1.

FIG. 17 represents that the floor panel 1 further comprises means for restricting the bending-through by its own weight. To this aim, the floor panel 1 comprises an embedded profile 53, for example, a profile which is based on synthetic material or metal and preferably is extruded. In the case of synthetic material, glass fibers or other filler materials can be applied in the material in order to obtain a higher bending strength. In this case, the embedded profile 53 relates to an I-profile. Of course, other profiles can also be applied. Preferably, profiles are striven for which have a largest-possible moment of inertia when bending. The embedded profile 53 globally extends in the longitudinal direction of the floor panel 1 and in this case is located closer to the long edge 2 with the profile of the tongue 20 than to the opposite long edge 3 with the profile of the groove 21. It is not excluded that the embedded profile 53 globally might extend according to the diagonal of the floor panel 1.

Figure 18:
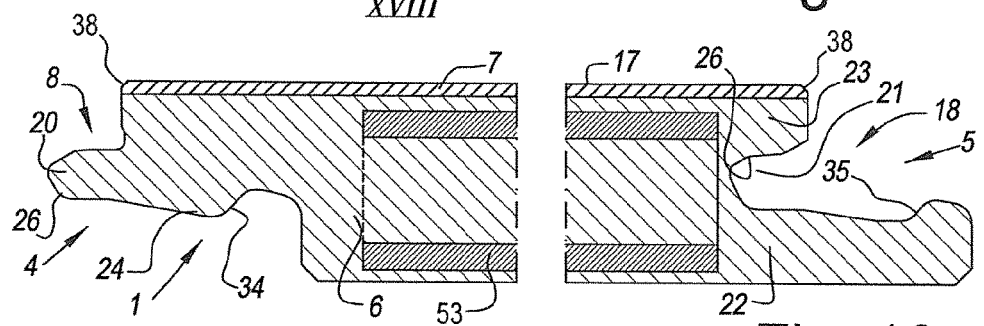
FIG. 18 represents a cross-section according to the line XVIII-XVIII represented in FIG. 17.

FIG. 18 represents that the embedded profile 53 in that case is situated integrally internally within the substrate 6. However, it is not excluded that the profile 53, on one or more long or short edges, might extend into the profile 26, where it then preferably also has the same profile 26 as the remaining parts of the respective edge.

Figure 19:
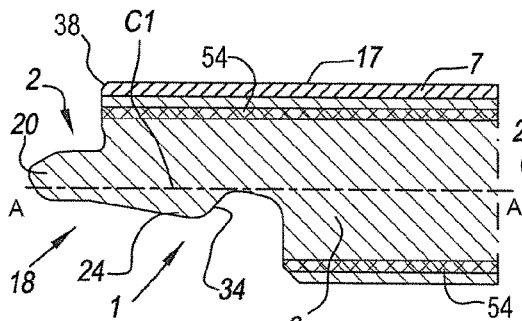
FIGS. 19 and 20, in a view similar to that of the left-hand part of FIG. 17, represent variants.

FIG. 19 represents a variant, wherein instead of an embedded profile 53, at least one glass fiber mat or glass fabric layer 54 embedded in the substrate 6 is used, which is situated outside of the center line A-A of the substrate 6, or outside of the neutral fiber, when bending the floor panel 1. In this case, the glass fabric layer 54 is situated closer to the decorative side 17 than to the lower side of the substrate 6. Of course, a plurality of such glass fiber-containing layers can be applied, and possibly they may be situated on both sides of the center line of the substrate. According to the invention, such reinforcing layer does not necessarily have to be embedded in the substrate 6 but may also be located in the top layer, for example, underneath the print 9, or in the underlying layer 12.

Figure 20:
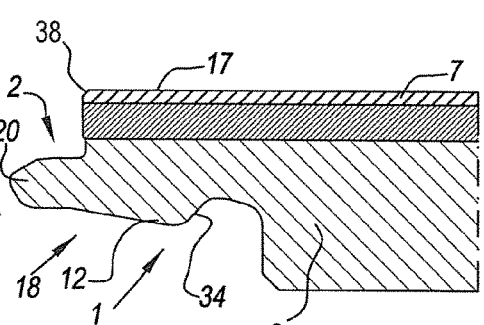

FIG. 20 represents a variant, wherein at least one layer 55 of the floor panel 1 has a density of more than 650 kilograms per cubic meter. In this case, between the top layer 7 and the substrate 6, in this case of soft PVC, a HDF board having a thickness of 3 millimeters or more and a density of at least 1000 kilograms per cubic meter is applied. Instead of using a wood-based board material, also hard PVC or other hard synthetic material can be used.

In FIGS. 16 to 20, also the measure is applied that the floor panels have a thickness of 5 millimeters or more. Preferably, the thickness is limited to a maximum of 7, 8 or 9 millimeters.

It is clear that the means restricting the bending can also be applied in floor panels having a length of less than 180 centimeters, however, preferably of more than 110 centimeters. According to a deviating variant, the invention thus also relates to such floor panels. It is clear that such floor panel further also can show the preferred characteristics of the floor panels of the first, second and/or third aspect, with the difference that they have a length of less than 180 centimeters.

The present invention is in no way limited to the herein above-described embodiments; on the contrary, such panels may be realized according to various variants without leaving the scope of the present invention. Moreover, the panels, instead of as floor panels, also can be realized as wall panels or ceiling panels or even as furniture panels.

The invention claimed is:

1. A floor panel comprising:
a substrate;
a top layer located above the substrate; and
a backing layer located below the substrate;
wherein the substrate includes a closed cell foamed PVC board having a density of more than 650 kilograms per cubic meter;
wherein the substrate has a thickness of 2 to 10 millimeters;
wherein the substrate forms at least half of the thickness of the floor panel;
wherein the top layer includes a back layer, a printed synthetic film located above the back layer, a transparent or translucent thermoplastic layer located above the printed synthetic film and a lacquer layer located above the transparent or translucent thermoplastic layer;
wherein the back layer includes PVC with plasticizers and fillers;
wherein the transparent or translucent thermoplastic layer includes PVC;
wherein the transparent or translucent thermoplastic layer has a thickness of 1 millimeter or less;
wherein the top layer has a thickness of 0.5 to 3 millimeters;
wherein the floor panel has a thickness of 0.5 to 15 millimeters;
wherein the floor panel is rectangular and oblong and includes a pair of long edges and a pair of short edges;
wherein the floor panel includes first mechanical coupling parts at the pair of long edges and second mechanical coupling parts at the pair of short edges;
wherein the first mechanical coupling parts are arranged for horizontal and vertical locking of two of such floor panels using a turning movement along the respective long edges;
wherein the first mechanical coupling parts include a tongue and a groove;
wherein the tongue and the groove are substantially responsible for the vertical locking;
wherein the tongue and the groove include locking parts substantially responsible for the horizontal locking;
wherein the first mechanical coupling parts are substantially realized in the substrate;
wherein the second mechanical coupling parts comprise a male coupling part and a female coupling part arranged for horizontal and vertical locking of two of such floor panels using a downward movement along the respective short edges;
wherein the downward movement is automatically created by the turning movement along the respective long edges;
wherein the second mechanical coupling parts are substantially realized in the substrate; and
wherein the floor panel has a length of more than 110 centimeters.

2. The floor panel of claim 1, wherein the back layer is located above the center line determined by the tongue-in-groove coupling.

3. The floor panel of claim 1, wherein the floor panel has a thickness of 7 to 10 millimeters.

4. The floor panel of claim 1, wherein the floor panel will bend less than 25 centimeters per meter under its own weight.

5. The floor panel of claim 1, wherein the backing layer includes a thermoplastic material layer.

6. The floor panel of claim 1, wherein the floor panel will bend less than 10 centimeters per meter under its own weight.

7. A floor panel comprising:
a substrate; and
a top layer located above the substrate;
wherein the substrate is single layered and includes PVC material having a density of more than 650 kilograms per cubic meter;
wherein the substrate has a thickness of 2 to 10 millimeters;
wherein the substrate forms at least half of the thickness of the floor panel;
wherein the top layer includes a printed synthetic film, a transparent or translucent thermoplastic layer located above the printed synthetic film and a lacquer layer located above the transparent or translucent thermoplastic layer;
wherein the transparent or translucent thermoplastic layer includes PVC material and a percentage of plasticizer of 5 to 75 percent by weight;
wherein the transparent or translucent thermoplastic layer has a thickness of 1 millimeter or less;
wherein the PVC material of the substrate is harder than the PVC material of the transparent or translucent thermoplastic layer;
wherein the floor panel is free of intermediate layers between the printed synthetic film and the substrate;
wherein the floor panel is rectangular and oblong and includes a pair of long edges and a pair of short edges;
wherein the floor panel includes first mechanical coupling parts at the pair of long edges and second mechanical coupling parts at the pair of short edges;
wherein the first mechanical coupling parts are arranged for horizontal and vertical locking of two of such floor panels using a turning movement along the respective long edges;
wherein the first mechanical coupling parts include a tongue and a groove;
wherein the tongue and the groove are substantially responsible for the vertical locking;
wherein the tongue and the groove include locking parts substantially responsible for the horizontal locking;
wherein the first mechanical coupling parts are substantially realized in the substrate;
wherein the second mechanical coupling parts comprise a male coupling part and a female coupling part arranged for horizontal and vertical locking of two of such floor panels using a downward movement along the respective short edges;
wherein the downward movement is automatically created by the turning movement along the respective long edges;
wherein the second mechanical coupling parts are substantially realized in the substrate; and
wherein the floor panel has a length of more than 110 centimeters.

8. The floor panel of claim 7, wherein the PVC material of the substrate is hard PVC material.

9. The floor panel of claim 7, wherein the PVC material of the substrate has a density of more than 750 kilograms per cubic meter.

10. The floor panel of claim 7, wherein the top layer includes an annealed or relaxed thermoplastic layer.

11. The floor panel of claim 7, wherein the transparent or translucent thermoplastic layer has a Shore A hardness situated between 50 and 100.

12. The floor panel of claim 7, wherein the floor panel comprises a backing layer located below the substrate.

13. The floor panel of claim 7, wherein the floor panel has a thickness of 5 to 15 millimeters.

14. The floor panel of claim 7, wherein the floor panel will bend less than 25 centimeters per meter under its own weight.

15. The floor panel of claim 7, wherein the floor panel will bend less than 10 centimeters under its own weight.

16. A floor panel comprising:
a substrate; and
a top layer located above the substrate;
wherein the substrate includes polyethylene or polypropylene material having a density of more than 450 kilograms per cubic meter;
wherein the substrate has a thickness of 2 to 10 millimeters;
wherein the substrate forms at least half of the thickness of the floor panel;
wherein the top layer includes a digital print and a transparent or translucent layer located above the digital print;
wherein the digital print is applied directly on the substrate;
wherein the floor panel is rectangular and oblong and includes a pair of long edges and a pair of short edges;
wherein the floor panel includes first mechanical coupling parts at the pair of long edges and second mechanical coupling parts at the pair of short edges;
wherein the first mechanical coupling parts are arranged for horizontal and vertical locking of two of such floor panels using a turning movement along the respective long edges;
wherein the first mechanical coupling parts include a tongue and a groove;
wherein the tongue and the groove are substantially responsible for the vertical locking;
wherein the tongue and the groove include locking parts substantially responsible for the horizontal locking;
wherein the first mechanical coupling parts are substantially realized in the substrate;
wherein the second mechanical coupling parts comprise a male coupling part and a female coupling part arranged for horizontal and vertical locking of two of such floor panels using a downward movement along the respective short edges;
wherein the downward movement is automatically created by the turning movement along the respective long edges;
wherein the second mechanical coupling parts are substantially realized in the substrate;
wherein the floor panel is provided with chamfers at the pair of long edges;
wherein the chamfers extend to below the global level of the digital print and through the transparent or translucent layer and the digital print into the substrate; and
wherein the chamfers form a V-groove in a coupled condition of two of such floor panels.

17. The floor panel of claim 16, wherein the chamfers are provided with a separate decorative layer.

18. The floor panel of claim 17, wherein the separate decorative layer includes a lacquer layer.

19. The floor panel of claim 16, wherein the polyethylene or polypropylene material has a density of more than 650 kilograms per cubic meter.

20. The floor panel of claim 16, wherein the substrate is a single layer.

21. The floor panel of claim 16, wherein the transparent or translucent layer has a thickness of 1 millimeter or less.

22. The floor panel of claim 16, wherein the transparent or translucent layer is a thermoplastic layer.

23. The floor panel of claim 16, wherein the digital print includes pigment-based inks.

24. The floor panel of claim 16, wherein the digital print shows a wood pattern.

25. The floor panel of claim 16, wherein the floor panel comprises a backing layer located below the substrate.

26. The floor panel of claim 16, wherein the floor panel has a thickness of 5 to 15 millimeters.

27. The floor panel of claim 16, wherein the floor panel has a length of more than 110 centimeters.

28. The floor panel of claim 16, wherein the floor panel will bend less than 10 centimeters per meter under its own weight.

\* \* \* \* \*

UNITED STATES PATENT AND TRADEMARK OFFICE
CERTIFICATE OF CORRECTION

PATENT NO. : 10,190,323 B2
APPLICATION NO. : 16/033494
DATED : January 29, 2019
INVENTOR(S) : Meersseman et al.

It is certified that error appears in the above-identified patent and that said Letters Patent is hereby corrected as shown below:

On the Title Page

Page 3
Item (56), References Cited, U.S. Patent Documents, change "6,477,948 11/2002 Missing et al." to –6,447,948 11/2002 Nissing et al.–
Item (56), References Cited, U.S. Patent Documents, change "6,933,043 8/2005 Son" to –6,933,043 8/2005 Son et al.–
Item (56), References Cited, U.S. Patent Documents, change "3,038,363 10/2011 Hannig et al." to –8,038,363 10/2011 Hannig et al.–

Page 5
Item (56), References Cited, Other Publications, change "Thong, "Building Plastic," China Petrochemical Press, Jan. 2007, 6 Pages" to –Zhong, "Building Plastic," China Petrochemical Press, Jan. 2007, 6 Pages–

In the Claims

Column 18
Line 27, Claim 1 change "0.5" to –5–

Signed and Sealed this
Twenty-third Day of April, 2019

Andrei Iancu
*Director of the United States Patent and Trademark Office*